(12) United States Patent
Minamino et al.

(10) Patent No.: US 7,779,005 B2
(45) Date of Patent: Aug. 17, 2010

(54) DATABASE MANAGEMENT APPARATUS AND METHOD OF MANAGING DATABASE

(75) Inventors: Noriko Minamino, Tokyo (JP); Hiroshi Murayama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 10/580,271

(22) PCT Filed: Mar. 2, 2006

(86) PCT No.: PCT/JP2006/304524

§ 371 (c)(1), (2), (4) Date: May 25, 2006

(87) PCT Pub. No.: WO2006/093333

PCT Pub. Date: Sep. 8, 2006

(65) Prior Publication Data
US 2009/0100001 A1 Apr. 16, 2009

(30) Foreign Application Priority Data
Mar. 4, 2005 (JP) .............................. 2005-061121

(51) Int. Cl.
*G06F 17/30* (2006.01)
(52) U.S. Cl. .................. 707/736; 707/755; 707/758; 707/796
(58) Field of Classification Search .............. 707/3, 707/101, 102, 2, 713, 736, 755, 758
See application file for complete search history.

(56) References Cited

U.S. PATENT DOCUMENTS

| 5,295,261 | A | * | 3/1994 | Simonetti ............ 707/999.002 |
| 5,499,365 | A | * | 3/1996 | Anderson et al. ............ 707/758 |
| 6,252,956 | B1 | * | 6/2001 | Karino .................... 707/999.1 |
| 6,629,094 | B1 | * | 9/2003 | Colby et al. ................. 707/713 |

(Continued)

FOREIGN PATENT DOCUMENTS

EP     1 583 002 A2     10/2005

(Continued)

OTHER PUBLICATIONS

Chochon et. al.,"Reducing parts diversity in product design: a data centered approach", Jul. 2003, Proceedings of CE'2003, pp. 1-8.*

(Continued)

*Primary Examiner*—Charles Rones
*Assistant Examiner*—Rezwanul Mahmood
(74) *Attorney, Agent, or Firm*—Finnegan, Henderson, Farabow, Garrett & Dunner, L.L.P.

(57) ABSTRACT

Information on a referenced class or a referenced property is extracted from at least one referenced dictionary having a referencing relation with a referencing dictionary having the hierarchical structure, in which lower classes inherit the properties of upper classes; the extracted information is added to the referencing dictionary and organized; the extracted detailed information is outputted organized referencing dictionary. Thus, the detailed information on an imported property may be acquired simply at the side of the referencing dictionary. In addition, since only the information on the referenced class or property in the referenced dictionary is separately extracted, traffic of the dictionary data may be reduced, and the efficient inter-dictionary data exchange can be realized.

11 Claims, 21 Drawing Sheets

U.S. PATENT DOCUMENTS

| | | | |
|---|---|---|---|
| 7,085,773 B2 * | 8/2006 | Dorsett, Jr. | 707/755 |
| 2003/0093263 A1 * | 5/2003 | Chen et al. | 704/10 |
| 2003/0105770 A1 * | 6/2003 | MacLeod et al. | 707/103 R |
| 2004/0002991 A1 * | 1/2004 | Bogdan et al. | 707/102 |
| 2004/0093344 A1 * | 5/2004 | Berger et al. | 707/102 |
| 2004/0107209 A1 * | 6/2004 | Minamino et al. | 707/102 |
| 2004/0162838 A1 * | 8/2004 | Murayama et al. | 707/100 |
| 2005/0027724 A1 * | 2/2005 | Minamino et al. | 707/100 |
| 2005/0203869 A1 | 9/2005 | Minamino et al. | |
| 2005/0234978 A1 * | 10/2005 | Minamino et al. | 707/103 R |
| 2006/0080299 A1 * | 4/2006 | Shimogori et al. | 707/3 |
| 2008/0235271 A1 * | 9/2008 | Wang | 707/103 R |
| 2009/0024997 A1 * | 1/2009 | Kobayashi | 718/101 |

FOREIGN PATENT DOCUMENTS

| | | |
|---|---|---|
| JP | 2002-24208 | 1/2002 |
| JP | 2002-41697 | 2/2002 |
| JP | 2004-177996 | 6/2004 |
| JP | 2004-178015 | 6/2004 |
| KR | 2003-0045668 A | 6/2003 |

OTHER PUBLICATIONS

Kim, W., "Object-Oriented Concepts, Databases, and Applications," ACM Press, pp. 6-11, (1989).

Office Action issued by the Japanese Patent Office on Jan. 13, 2009, for Japanese Patent Application No. 2005-061121, and Partial English Translation thereof.

International Search Report and Written Opinion issued by the European Patent Office on Jul. 6, 2006, for International Application No. PCT/JP2006/304524.

Pierra et al., "From digital libraries to electronic catalogues for engineering and manufacturing," International Journal of Computer Applications in Technology (2003), 18:27-42.

Pierra, "Intelligent Electronic Component Catalogues for Engineering and Manufacturing," Proceedings of the International Symposium on Global Engineering Networking GEN '97 (Apr. 23, 1997), pp. 1-21.

Ondracek, "Electronic Catalogues Management and Usage," Proceedings of the International Symposium on Global Engineering Networking GEN '97 (Apr. 23, 1997), pp. 1-12.

International Standard IEC 61360, "Standard data element types with associated classification scheme for electric components—Part 2: Express dictionary schema," Edition 2.1, Feb. 2004, 92 pages.

International Standard ISO 6523, "Data interchange—Structure for the identification of organizations," First edition, Feb. 1, 1984, 11 pages.

International Standard ISO 13584-1, "Industrial automation systems and integration—Parts library—Part 1: Overview and fundamental principles," Oct. 25, 2000, 24 pages.

International Standard ISO 13584-10, "Industrial automation systems and integration—Parts library—Part 10: Conceptual Model of Parts Library," Feb. 24, 1995, 41 pages.

International Standard ISO 13584-20, "Industrial automation systems and integration—Parts library—Part 20: Logical model of expressions," Jun. 5, 1997, 96 pages.

International Standard ISO 13584-24, "Industrial automation systems and integration—Parts library—Part 24: Logical resource: Logical model of supplier library," First edition, 2003, 673 pages.

International Standard ISO 13584-25, "Industrial automation systems and integration—Parts library—Part 25: Logical resources: Logical model of supplier library with aggregate values and explicit content," Mar. 28, 2003, 105 pages.

International Standard ISO 13584-26, "Industrial automation systems and integration—Parts library—Part 26: Logical resource: Information supplier identification," First edition, Feb. 1, 2000, 20 pages.

International Standard ISO 13584-32, "Industrial automation systems and integration—Parts library—Part 32: Implementation resources: OntoML: Ontology markup language," May 26, 2008, 209 pages.

International Standard ISO 13584-35, "Industrial automation systems and integration—Parts library—Part 35: Spreadsheet interface for parts library—Representation structure," Aug. 17, 2006, 130 pages.

International Standard ISO 13584-1, "Industrial automation systems and integration—Parts library—Part 42: Methodology for structuring parts families," Jun. 5, 1997, 143 pages.

International Standard ISO 13584-1, "Industrial automation systems and integration—Parts library—Part 501: Reference dictionary for measuring instruments—Registration procedure," First Edition, Feb. 1, 2007, 58 pages.

International Standard ISO 13584-1, "Industrial automation systems and integration—Parts library—Part 511: Mechanical systems and components for general use—Reference dictionary for fasteners," Aug. 20, 2004, 196 pages.

PLIBEditor Manual, Oct. 20, 2001, 32 pages.

Originally filed specification for U.S. Appl. No. 10/717,561, filed Nov. 21, 2003, 52 pages.

Originally filed specification for U.S. Appl. No. 10/717,707, filed Nov. 21, 2003, 56 pages.

* cited by examiner

FIG.10

```
        <CASEOF>
          <PROPERTY>
            140/E-Commerce.E_C0001.E_P0001
          </PROPERTY>
201       <PROPERTY>
            140/E-Commerce.E_C0001.E_P0002
          </PROPERTY>
          <CLASS_PROPERTY>
            140/AAA.A_C001.A_P001
          </CLASS_PROPERTY>
        </CASEOF>
        <PART21>
        ISO-10303-21;
        HEADER;
        FILE_DESCRIPTION(('part21 test file'),'2;1');
        FILE_NAME('test file.spf','2004-06-04  16:22:18',('Author'),
        ('T-Company'),'','','');
        FILE_SCHEMA(('ISO13584_25_IEC61360_5_ LIBRARY_IMPLICIT_SCHEMA'));
        ENDSEC;
202
        DATA;
          :
          :
        ENDSEC;
        END-ISO-10303-21;
        </PART21>
```

FIG.11

```
:
FILE_NAME('test.spf','2004-06-04 16:22:18'('author'),('T-company',
'<caseof><property>140/E-commerce.E-C0001.E-P00001</propery></caseof>',
'<caseof><property>140/E-commerce.E-C0001.E-P00002</propery></caseof>',
'<caseof><class_property>140/AAA.A-C001.A-P001</class_propery></caseof>'),
'','','');
:
```

FIG.12

```
ENTITY extension_item_class_case_of
SUBTYPE OF item_class_case_of;
  imported_areas :  LIST OF text;
END_ENTITY;
```

FIG.13

```
< BEFORE EXTENSION >
  :
#16548=ITEM_CLASS(#10,#16565,'001',#16546,#16542,#16540,$,$,#16556,(#11798,
#11787,#11775,#11714),(),$,(),(),$);
  :
< AFTER EXTENSION >
  :
#16548=ITEM_CLASS(#10,#16565,'001',#16546,#16542,#16540,$,$,#16556,(#11798,
#11787,#11775,#11714),(),$,(),(),$,
('<property>140/E-commerce.E-C0001.E-P00001</property>',
'<property>140/E-commerce.E-C0001.E-P00002</propery>',
'<class_property>140/AAA.A-C001.A-P001</class_propery>'));
  :
```

FIG.16

```
         :
         SYNCOPATED
         :
/* SUPPLIER INFORMATION */
 #16567=SUPPLIER_BSU('140/TOPAS//',*);
 #16570=SUPPLIER_ELEMENT(#16567,#16571,'001',#16569,#16568);
 #16571=DATES('2003-10-29','2003-10-29','2003-10-29');
 #16569=ORGANIZATION('TOPAS','T-company',' T-company');
 #16568=ADDRESS($,'1-1-1','Shibaura',$,'Minato-ku','Tokyo','105-
8001','JAPAN','+81-3-3457-4511','',$,$);
/* CLASS INFORMATION */
 #16556=CLASS_BSU('TOPAS_C000001','001',#16567);
 #16557=ITEM_CLASS_CASE_OF(#16556,#16564,'001',#16555,#16550,$,$,$,#1
6565,(#12100,#12091,#12082,#12072,
#12062,#12051,#12040,#12029,#11987),
(),$,(),(),$, *,*,*,*,*, (#10),(#112660, #112650),(),(),());
 #16564=DATES('2004-06-04','2004-06-04','2004-06-04');
 #16555=ITEM_NAMES(#16554,(#16551),LABEL(''),#1008,$);
 #16554=TRANSLATED_LABEL(('NOTE PC','ノートPC'),#1008);
 #16551=LABEL_WITH_LANGUAGE('PC','en');
 #16550=TRANSLATED_TEXT(('note type personal computer','ノート型のパーソ
ナルコンピュータ'),#1008);
 #1008=PRESENT_TRANSLATIONS(('en','ja'));

:
         SYNCOPATED
         :
/* REFERENCED CLASS INFORMATION*/
 #2=SUPPLIER_BSU('140/E-Commerce//', *);
 #10=CLASS_BSU('EC_C0001', '001', #2);
 #112650=PROPERTY_BSU('EC_P0001','005',#10);
/* REFERENCED PROPERTY INFORMATION*/
#7534=NON_DEPENDENT_P_DET(#112650,#16564,'001',#7532,#7527,$,$,$,$,(),
$,$,#7524,$);
 #7532=ITEM_NAMES(#7531,(#7528),LABEL(''),#1008,$);
 #7531=TRANSLATED_LABEL(('STANDARD PRICE','標準価格'),#1008);
 #7528=LABEL_WITH_LANGUAGE('PRICE','en');
 #7527=TRANSLATED_TEXT(('price by JPY, either a general standard price or a
referential price.','日本円で表した標準価格'),#1008);
 #7524=REAL_MEASURE_TYPE('NR2..0.3',#7523);
 #7523=DIC_UNIT(#7522,$);
 #7522=NON_SI_UNIT(#7521,'JPY');
 #7521=DIMENSIONAL_EXPONENTS(0.,0.,0.,0.,0.,0.,0.);
 #112660=PROPERTY_BSU('EC_P0002','005',#10);
 #7620=NON_DEPENDENT_P_DET(#112660,#16564,'001',#7618,#7614,$,$,$,$,(),
$,$,#6657,$);
 #7618=ITEM_NAMES(#7617,(),LABEL(''),#1008,$);
 #7617=TRANSLATED_LABEL(('END DATE OF SALES','販売終了日'),#1008);
 #7614=TRANSLATED_TEXT(('the date the sale of the product is to end','販売を終
了する日付'),#1008);
 #6657=STRING_TYPE('M..512');

ENDSEC;
END-ISO-10303-21;
```

FIG.17

```
         :
         SYNCOPATED
         :
/* REFERENCED CLASS INFORMATION */
#2=SUPPLIER_BSU('140/E-Commerce//', *);
#16556=CLASS_BSU('EC_ROOT','001',#2);
#10=CLASS_BSU('EC_C0001', '001', #2);
#16548=ITEM_CLASS(#10,#16565,'001',#16546,#16542,#16540,$,$,#16556,(#117
98,#11787,#11775,#11714),(),$,(),(),$);
#16565=DATES('2004-06-04','2004-06-04','2004-06-04');
#16546=ITEM_NAMES(#16545,(),LABEL(''),$,$);
#16545=TRANSLATED_LABEL(('E-Commerce','イーコマース'),#1008);
#16542=TRANSLATED_TEXT(('Class for E-Commerce','電子商取引のためのクラス
'),#1008);
/* REFERENCED PROPERTY INFORMATION*/
#112650=PROPERTY_BSU('EC_P0001','005',#10);
#7534=NON_DEPENDENT_P_DET(#112650,#16564,'001',#7532,#7527,$,$,$,$,(),
$,$,#7524,$);
#7532=ITEM_NAMES(#7531,(#7528),LABEL(''),#1008,$);
#7531=TRANSLATED_LABEL(('STANDARD PRICE','標準価格'),#1008);
#7528=LABEL_WITH_LANGUAGE('PRICE','en');
#7527=TRANSLATED_TEXT(('price by JPY, either a general standard price or a
referential price.','日本円で表した標準価格'),#1008);
#7524=REAL_MEASURE_TYPE('NR2..0.3',#7523);
#7523=DIC_UNIT(#7522,$);
#7522=NON_SI_UNIT(#7521,'JPY');
#7521=DIMENSIONAL_EXPONENTS(0.,0.,0.,0.,0.,0.,0.);
#112660=PROPERTY_BSU('EC_P0002','005',#10);
#7620=NON_DEPENDENT_P_DET(#112660,#16564,'001',#7618,#7614,$,$,$,$,(),
$,$,#6657,$);
#7618=ITEM_NAMES(#7617,(),LABEL(''),#1008,$);
#7617=TRANSLATED_LABEL(('END DATE OF SALES','販売終了日'),#1008);
#7614=TRANSLATED_TEXT(('the date the sale of the product is to end','販売を終
了する日付'),#1008);
#6657=STRING_TYPE('M..512');

ENDSEC;
END-ISO-10303-21;
```

FIG.18

```
    :
    SYNCOPATED
    :
/* REFERENCED SUPPLIER INFORMATION*/
#2=SUPPLIER_BSU('140/E-Commerce//', *');
#21=SUPPLIER_ELEMENT(#2,#22,'001',#23,#24);
#22=DATES('2003-10-29','2003-10-29','2003-10-29');
#23=ORGANIZATION('EC','E-Commerce','Organization for E-Commerce');
#24=ADDRESS($,'1-1-1','Shibaura',$,'Minato-ku','Tokyo','105-8001','JAPAN','+81-
3-3457-4511','',$,$);
/* REFERENCED CLASS INFORMATION */
#16556=CLASS_BSU('EC_ROOT','001',#2);
#10=CLASS_BSU('EC_C0001', '001', #2);
#16548=ITEM_CLASS(#10,#16565,'001',#16546,#16542,#16540,$,$,#16556,(#11
798,#11787,#11775,#11714),(),$,(),(),$);
#16565=DATES('2004-06-04','2004-06-04','2004-06-04');
#16546=ITEM_NAMES(#16545,(),LABEL(''),$,$);
#16545=TRANSLATED_LABEL(('E-Commerce','イーコマース'),#1008);
#16542=TRANSLATED_TEXT(('Class for E-Commerce','電子商取引のためのクラ
ス'),#1008);
/* REFERENCED PROPERTY INFORMATION */
#112650=PROPERTY_BSU('EC_P0001','005',#10);
#7534=NON_DEPENDENT_P_DET(#112650,#16564,'001',#7532,#7527,$,$,$,$,(),
$,$,#7524,$);
#7532=ITEM_NAMES(#7531,(#7528),LABEL(''),#1008,$);
#7531=TRANSLATED_LABEL(('STANDARD PRICE','標準価格'),#1008);
#7528=LABEL_WITH_LANGUAGE('PRICE','en');
#7527=TRANSLATED_TEXT(('price by JPY, either a general standard price or a
referential price.','日本円で表した標準価格'),#1008);
#7524=REAL_MEASURE_TYPE('NR2..0.3',#7523);
#7523=DIC_UNIT(#7522,$);
#7522=NON_SI_UNIT(#7521,'JPY');
#7521=DIMENSIONAL_EXPONENTS(0.,0.,0.,0.,0.,0.,0.);
#112660=PROPERTY_BSU('EC_P0002','005',#10);
#7620=NON_DEPENDENT_P_DET(#112660,#16564,'001',#7618,#7614,$,$,$,$,(),
$,$,#6657,$);
#7618=ITEM_NAMES(#7617,(),LABEL(''),#1008,$);
#7617=TRANSLATED_LABEL(('END DATE OF SALES','販売終了日'),#1008);
#7614=TRANSLATED_TEXT(('the date the sale of the product is to end','販売を終
了する日付'),#1008);
#6657=STRING_TYPE('M..512');

ENDSEC;
END-ISO-10303-21;
```

DATABASE MANAGEMENT APPARATUS AND METHOD OF MANAGING DATABASE

TECHNICAL FIELD

The present invention relates to an apparatus and a method for managing a database, and specifically, to an apparatus and a method for managing a database having a hierarchical structure, in which lower classes inherit properties of upper classes, wherein the classes and the properties thereof have their own identifier for uniquely identifying themselves, and having a referencing dictionary capable of acquiring the properties defined in an existing referenced dictionary by their identifiers.

BACKGROUND ART

Hereinafter, the apparatus and the method for managing the database will be described.

A hierarchical database, which is exemplified by an object-oriented database (OODB) and an object relational database (ORDB), has a hierarchal structure, in which lower classes inherit properties of upper classes. In such a hierarchical database, the number of properties of the lower classes increases with inheritances from the upper classes. The inheritances of the properties of the upper classes to the lower classes are generally called "inheritance," the feature of which is described in various documents including.

In the OODB, a unit of classification of one level is generally called a "class." On the other hand, in the ORDB, a table that permits the inheritance corresponds to the class in the OODB. Between the tables with a hierarchical relation, the properties are inherited from upper tables to lower tables, in other words, header information of a column constituting an upper table is inherited to a lower table. Data having the same type of property and belonging to a certain class of each level is called an "instance," and a collection thereof is called a "population." The population of data is usually stored in a structure called a table in a relational database (RDB) or an ORDB. A string of properties making up a table is called a header of the table.

One of known hierarchical databases is defined by the ISO13584 Parts Library standard (hereinafter simply referred to as "PLIB" standard), which is an international standard for implementing an electronic catalogue system capable of electronically providing product information. The "PLIB" standard is an international standard consisting of a plurality of "Parts" and defines a manner for object-oriented description of products library data or parts library data and a semantics for file exchange, in other words, defines what kind of terms, manner for description, and data type are to be employed. Part 42 (Part Issue No. 42) of the PLIB has the same contents as the IEC61360-2 (Part Issue No. 2). The standard classifies products in an object-oriented manner, clarifies a group of properties characterizing each class, and achieves file exchange of the contents corresponding to the class, and therefore, the concept of property inheritance is naturally incorporated herein. Further, since the standard is formulated based on the ISO6523 "Structure for Identification of Organizations and Organization Parts," with the use of the International Code Designator (ICD) defined by ISO6523, in particular, an internationally unique identifier can be allocated to each property.

In recent years, systems based on the PLIB standard are proposed (for example, see Japanese Patent Application Laid-Open No. 2004-177996, and Japanese Patent Application Laid-Open No. 2004-178015).

The PLIB standard defines the data exchange format according to a basic concept that technical information on products should be represented by "dictionary" and "contents." The "dictionary" described herein is designed so that it may inherit a hierarchical relation and the properties corresponding to each level and therefore, an existing dictionary is usually referenced.

To represent an inter-"dictionary" referencing relation, the PLIB standard employs a "CaseOf" feature. This feature for representing the referencing relation enables the properties previously defined in another "dictionary (a referenced dictionary)" to be taken into the referencing dictionary for further use. The use of "CaseOf" allows for partial inter-class inheritance of the properties. Using the "CaseOf" feature to import and export a lot of properties, the same properties imported or exported may be used in another dictionary and therefore, such advantages are attained that actual product data exchange is facilitated and the need for preparing the dictionary is eliminated.

The referencing relation may be established with the inclusion of description of a Basic Semantic Unit (BSU) as a pointer in the referencing dictionary. The BSU is an identifier assigned to each of the classes or properties defined in the referenced dictionary.

There lies a problem, however, in that on the referencing dictionary side alone, any detailed information characterizing the imported properties including the name, definition, data type, and unit cannot be known. Accordingly, in order to acquire the detailed information on the imported property on the side of the referencing dictionary, the imported property in the referenced dictionary must be searched and information must be retrieved therefrom.

Usually, the referenced dictionary is an international standard defining a huge amount of classes and properties, while the properties to be referenced occupy just a small part therein, and therefore, an efficient scheme for inter-dictionary data communication is desired.

The present invention is devised to resolve the aforementioned problems and therefore, an object of the present invention is to provide an apparatus and a method for managing a database, which enables the detailed information on the imported property to be acquired on the referencing dictionary side and inter-dictionary data communication to be effectively performed.

DISCLOSURE OF INVENTION

A database management apparatus according to the present invention includes a extracting unit that extracts detailed information on at least one of a class and a property which is included in at least one referenced dictionary and which is referenced to by a referencing dictionary, the referencing dictionary having a hierarchical structure in which a lower class inherits a property of an upper class, each of the class and the property has an identifier which uniquely identifies each of the class and the property, the referenced dictionary having a referencing relation described by the identifier as a pointer with the referencing dictionary, a adding unit that adds the extracted detailed information to the referencing dictionary, and the database management apparatus further includes an output unit that outputs added referencing dictionary.

According to the present invention, the detailed information on the imported property may be acquired at the side of the referencing dictionary by; extracting the information on the referenced class or property from at least one referenced dictionary having a referencing relation with the referencing dictionary having the hierarchical structure, in which the lower classes inherit the properties of the upper classes; adding the extracted information to the referencing dictionary; organizing the referencing dictionary; adding the extracted detailed information to the referencing dictionary; and outputting the resulting information as the dictionary data. In addition, since only the information on the referenced class or property in the referenced dictionary is separately extracted, traffic of the dictionary data may be reduced, and the efficient inter-dictionary data exchange can be realized.

BRIEF DESCRIPTION OF DRAWINGS

FIG. 10 shows an example of description of dictionary data with an organizing scheme added;

FIG. 11 shows an example of description utilizing a header part of a Part21 file;

FIG. 12 shows an example of description with an attribute for adding information on the organizing scheme added;

FIG. 13 shows an example of the description of the Part21 file;

FIG. 16 shows an example of description of a referencing dictionary with detailed information on an imported property added;

FIG. 17 shows an example of the description of the referencing dictionary with detailed information on an imported property and detailed information on a class defining the imported property added thereto;

FIG. 18 shows an example of the description of the referencing dictionary with the detailed information on an imported property, the detailed information on a class defining the imported property, and detailed information on a supplier added thereto;

BEST MODE(S) FOR CARRYING OUT THE INVENTION

Now, referring to accompanying drawings, embodiments of an apparatus and a method for managing a database will be described in detail below. Note that the present invention is not limited only to the embodiments described herein.

First, referring to FIG. 1, an overview of an ISO13584 Parts Library standard (hereinafter, simply referred to as "PLIB") will be described. The PLIB forms a basis for the embodiments of the present invention, and is an international standard for the implementation of an electronic catalogue system which allows for electronic provision of product information.

Figure 1:
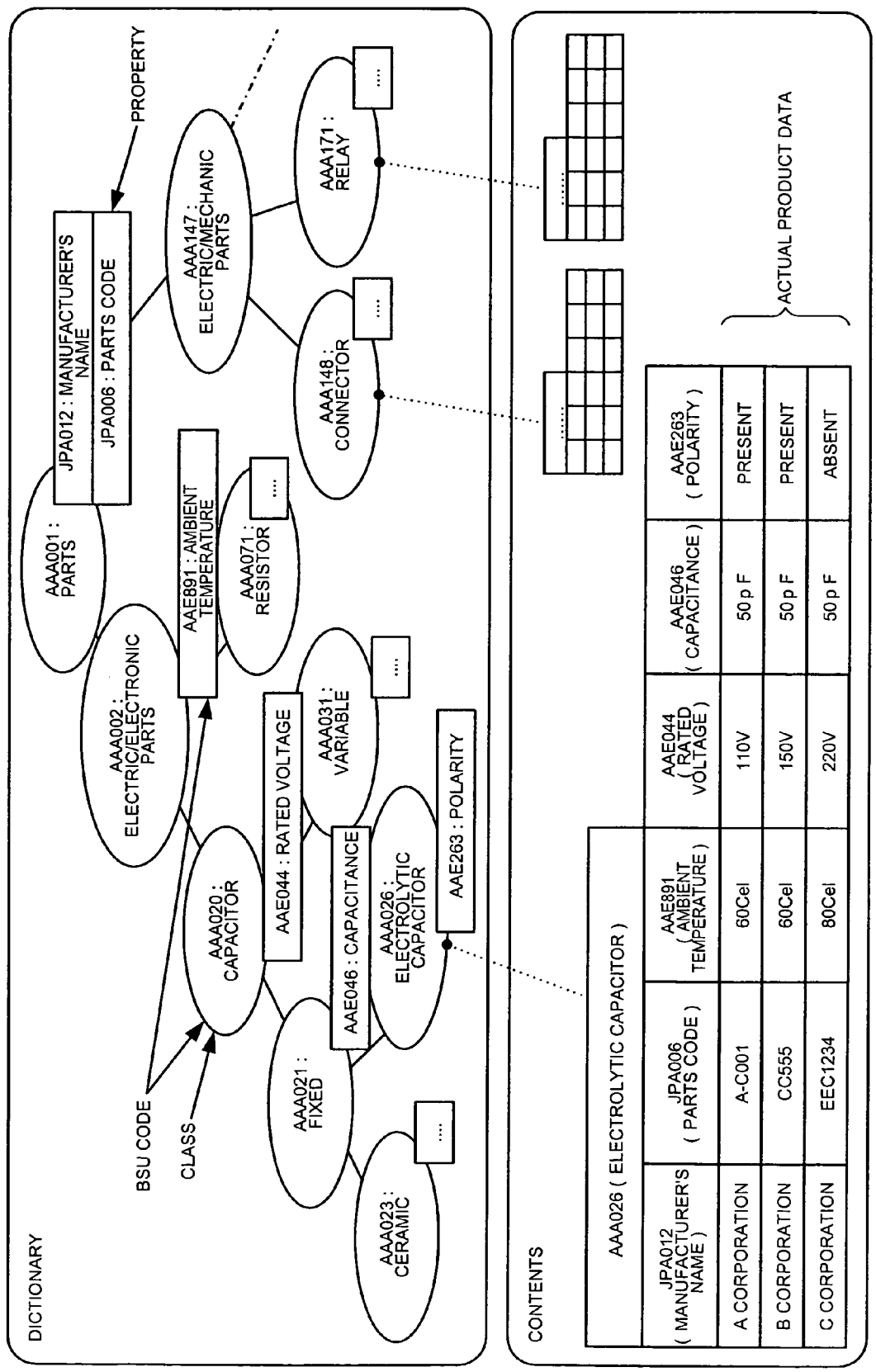
FIG. 1 is an explanatory diagram of an overview of an ISO13584 Parts Library standard, which is a basis for embodiments of the present invention.

As shown in FIG. 1, the "PLIB" standard defines one of hierarchical databases, in which the number of properties of lower classes increases with inheritances from upper classes. In such a "PLIB" standard, the electronic catalogue is made up of a "schema" and "contents", which have a common data structure for sharing and reusing of the product information. In the "schema" defined by the "PLIB" standard, product classification is represented hierarchically as a single tree structure of "product classes." Each "product class" has its own "properties" and the "properties" belonging to a certain "product class" are inherited to the "product classes" at the lower level. The hierarchical relation and inherited properties of each level are collectively referred to as a "dictionary." In other words, the "PLIB" standard is a standard, which defines a data model for describing the "dictionary" represented in the hierarchical database. A unique ID called a "BSU (Basic Semantic Unit) code" is assigned to each of the "product classes" and the "properties" thereof for the unique identification. On the other hand, the "contents" part is represented by a table, which contains property values specific to the individual products, which is inserted in the "properties," defined in the "schema".

Thus, the "PLIB" standard provides a framework for the electronic catalogue. Meanwhile, an effort to establish an international standard of a practical "schema" is made, and in particular, IEC61360 propels a standardization of upper hierarchical levels of the schema in electric and electronic industrial fields, in short, a general part of the "product classes" and the "properties" thereof. This enables product catalogue creators of manufacturers and distributors to determine specific details on the "product classes" and the "properties," thereof as lower hierarchical levels of the IEC 61360 schema and create their own contents. A user of the electronic catalogue containing the contents created in this way may follow up or down the hierarchical levels of the "product classes" to narrow down the desired product by referencing to the property value.

The foregoing is an overview of the "PLIB" standard.

Figure 2:
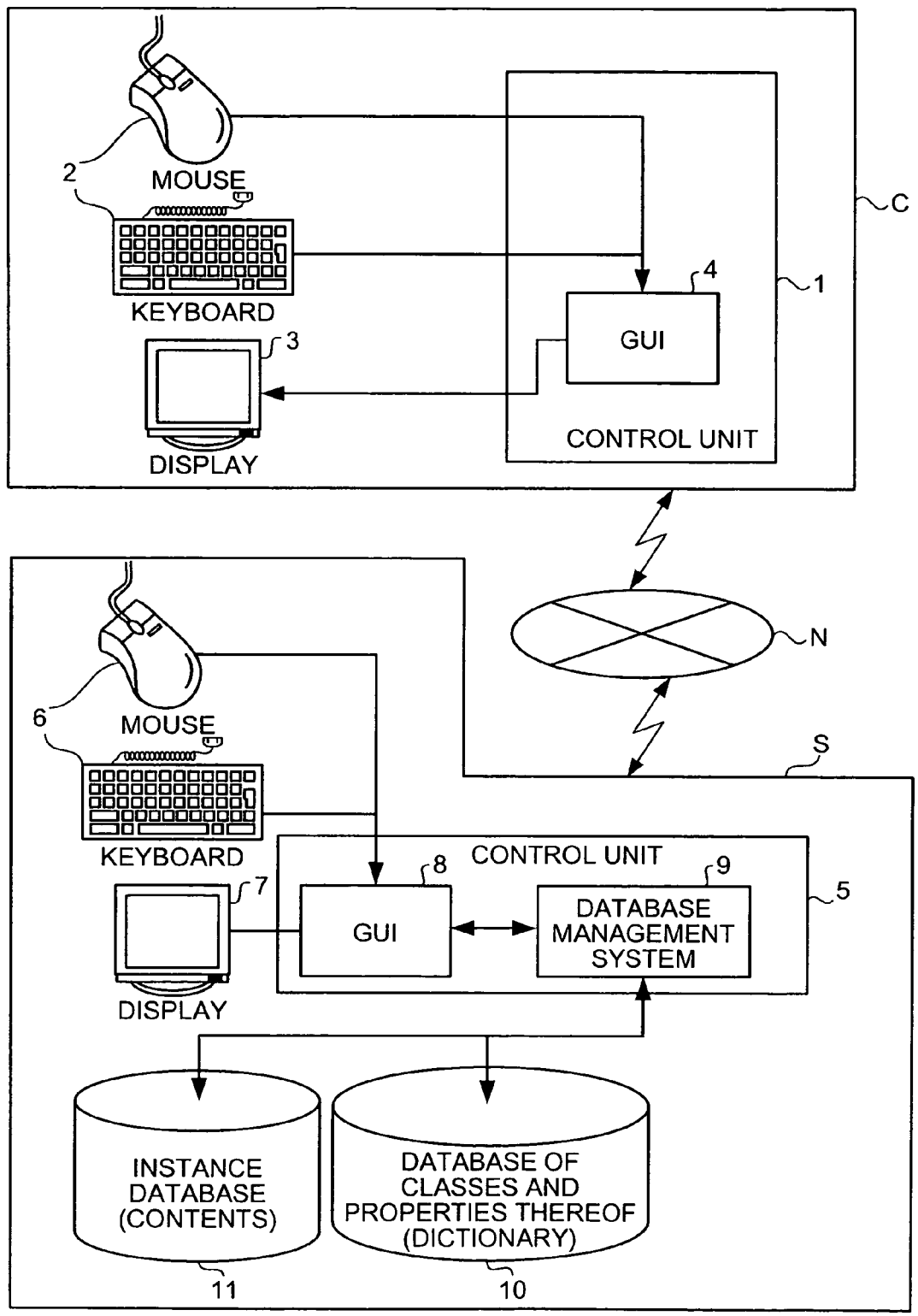
FIG. 2 is a block diagram of a schematic structure of a system including a database management apparatus according to one embodiment.

Next, one embodiment of the present invention will be described in detail. FIG. 2 is a block diagram of a schematic structure of a system including a database management apparatus according to one embodiment of the present invention.

The system includes a server S, which stores various types of information for describing product information ("dictionary information" including the hierarchical relation between product classes, detailed information on the product class such as a name and definition, and property information, and "contents (instance) information" or the like), and presents the information to the user at his/her request; and a client C, which issues a request for the product information to the server S. The server S and the client C are connected each other through a network N to achieve bi-directional data exchange therebetween. Here, the server S acts as the database management apparatus. It goes without saying that the present invention is not limited only to a client-server system enabling such network communications.

The client C is provided with a control unit 1 which includes a Central Processing Unit (CPU) controlling respective units and memory units such as a Hard Disk Drive (HDD), a Read Only Memory (ROM), and a Random Access Memory (RAM), an input unit 2, for example, a keyboard or a mouse, and an output unit 3, for example, a display in a general computer-based hardware configuration. The CPU follows a control program stored in the HDD to provide a Graphical User Interface (GUI) 4. Note that information may be output not only onto a screen of the display but also into a file.

The client C outputs data received from the server S to the output unit 3 through the GUI 4, and receives data and commands entered by the user from the input unit 2 through the GUI 4 and sends the data and commands to the server S.

Similarly to the client C, the server S is provided with a control unit 5 which includes a CPU, that controls respective units, and memory units such as a HDD, a ROM, and a RAM, an input unit 6, for example, a keyboard or a mouse, and an output unit 7, for example, a display in a general computer-based hardware configuration. The CPU follows the control program stored in the HDD to provide a GUI 8. The server S, moreover, is provided with a dictionary database 10 which stores the classes and the properties constituting the classes, collectively called as the "dictionary," and a database 11 which stores a set of property values called "contents" for each class, namely, an instance. The CPU follows a control program stored in the HDD to provide a database management system 9, which manages executions of processing such as data input/output to/from and data search in the databases 10 and 11.

A representative processing operation of the system will be described in brief below. Once receiving a processing request entered from the input unit 2 of the client C, the control unit 1 of the client C sends a processing request to the server S through the network N. The control unit 5 of the server S causes the database management system 9 to execute a necessary processing based on the received processing request. The database management system 9, for example, reads out necessary data from one of the databases 10 and 11, or references the data received from the client C through the network N to execute the necessary processing. The result of the executed processing may be stored in either the database 10 or 11, or may be sent to the client C. The result of the executed processing, after being sent to the client C, is displayed on the screen of the client C.

Hereinafter, the "dictionary", namely, the dictionary database 10 that stores the classes and the properties constituting the classes will be described in detail. The dictionary database 10 stores information on a relation between the classes and hence, when a certain class is selected, upper and lower classes of the selected class may be known. Further, the dictionary database 10 stores information on properties belonging to each class and hence, when a certain class is selected, information on all properties belonging to the selected class may be known.

Figure 3:
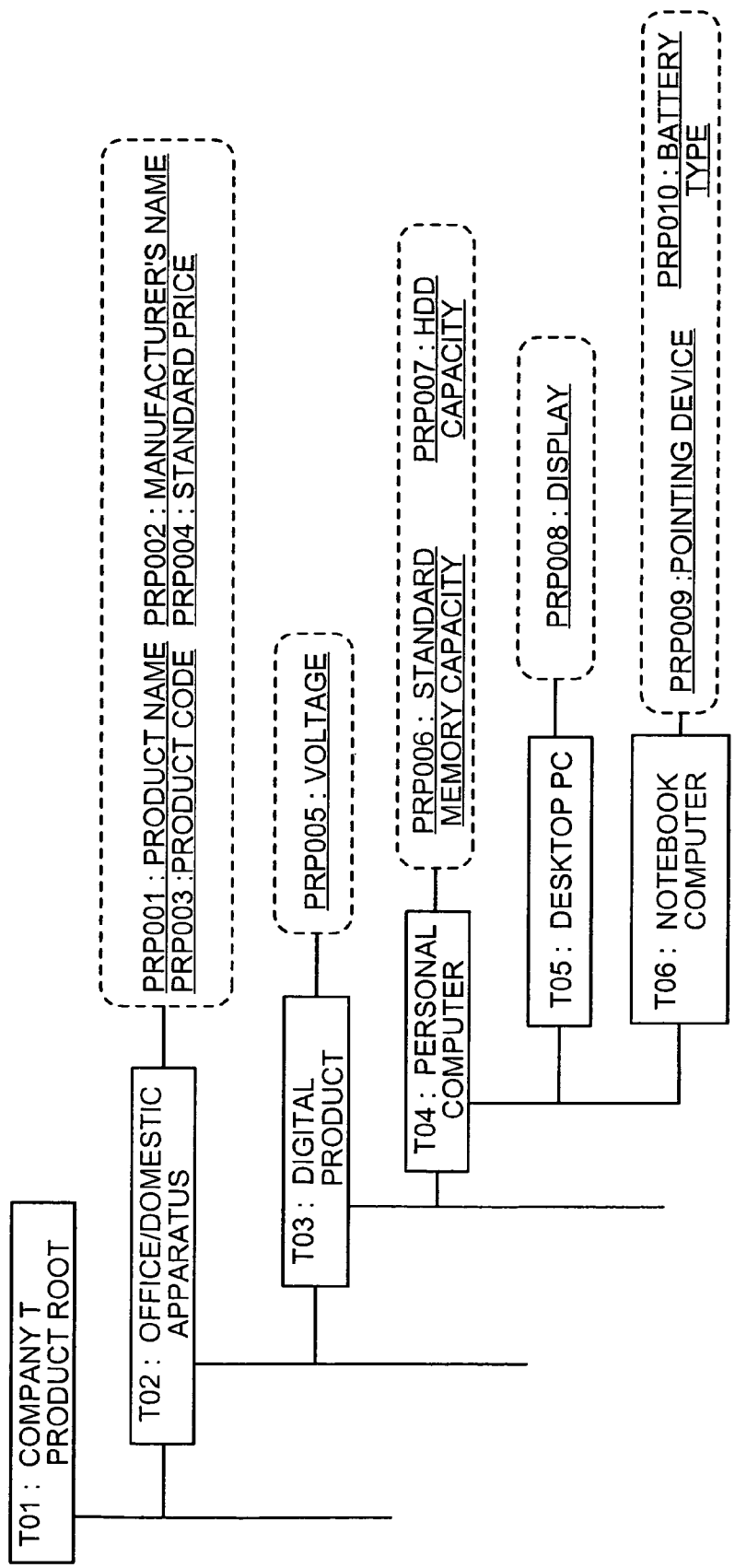
FIG. 3 is a schematic diagram of an example of a hierarchical structure of classes and properties belonging to each class.

FIG. 3 is a schematic diagram of an example of the hierarchical structure of the classes and the properties for each class. The properties of the upper classes are inherited to the lower classes. For this reason, as shown in FIG. 3, in the case where each class has the properties, the class "T05: desktop PC" inherits properties of the class "T02: office/domestic apparatus", i.e., "PRP001: product name", "PRP002: manufacture's name", "PRP003: product code", and "PRP004: standard price", the property of the class "T03: digital product", i.e., "PRP005: voltage", and the properties of the class "T04: personal computer", i.e., "PRP006: standard memory capacity" and "PRP007: HDD capacity", for example. The class "T05: desktop PC" may use eight properties in total including its own property "PRP008: display".

The "PLIB" standard may define the "dictionary" with a simple tree structure. This means that the class has a simple inheriting relation, in which the class has only one upper class. In the "PLIB" standard, however, to represent an inter-dictionary referencing relation, a feature of "CaseOf" is provided. According to the "CaseOf" feature for representing the referencing relation, the properties previously defined in another "dictionary (the referenced dictionary)" may be taken into own dictionary (the referencing dictionary) for further use. The "CaseOf" feature allows for partial inheritance, in which only the specific properties may be referenced between the classes. The "CaseOf" feature has advantages in that the same properties may be used in the different dictionaries through import and export of a lot of properties, that actual product data exchange is facilitated, and that the need for preparing the dictionary is eliminated.

Figure 4:
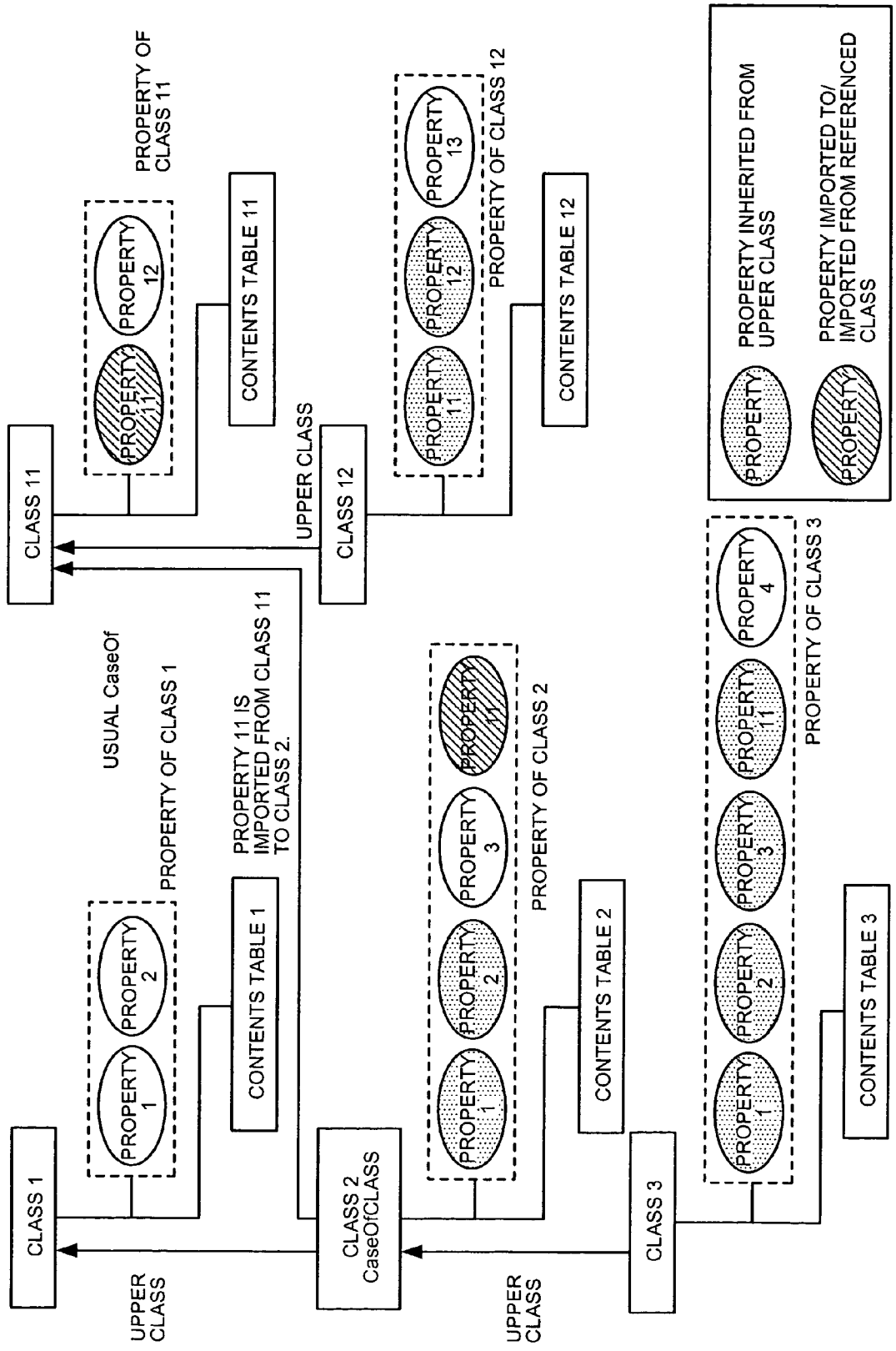
FIG. 4 is a schematic diagram of an example of a class tree based on a "CaseOf" scheme.

FIG. 4 is a schematic diagram of an example of the "CaseOf"-based class tree. In FIG. 4, the relation among the classes 1, 2, and 3 is represented in the simple tree structure, all of which are linked by the hierarchical relation of simple inheritance. The relation between classes 11 and 12 is also represented in the simple tree structure, both of which are linked by the hierarchical relation of simple inheritance and each of which inherits the properties of the upper class. In FIG. 4, the properties, of which background are dot-pattern printed, are the properties inherited from the upper class. For example, the class 2 has properties 1 and 2 inherited from the class 1. The class 2 defined in the "CaseOf" class imports a property 11 from the class 11 of another dictionary. The class 2 may subsequently use the imported property 11 as its own property. In this way, the CaseOf feature may realize a similar representation to the representation of a multi-inheriting relation, in which a child class inherits the properties from a plurality of parent classes.

The dictionary database 10 may also serve as a storing unit which stores a general dictionary (including the referenced dictionary) having the hierarchical structure, in which the lower classes inherit the properties of the upper classes; and the referencing dictionary, which allows for partial inheritance, wherein the properties defined in an existing referenced dictionary are acquired.

Next, characteristic functions performed by the database management system 9 will be described below. Note that the description of the functions performed by the conventional database management system will be omitted.

Figure 5:
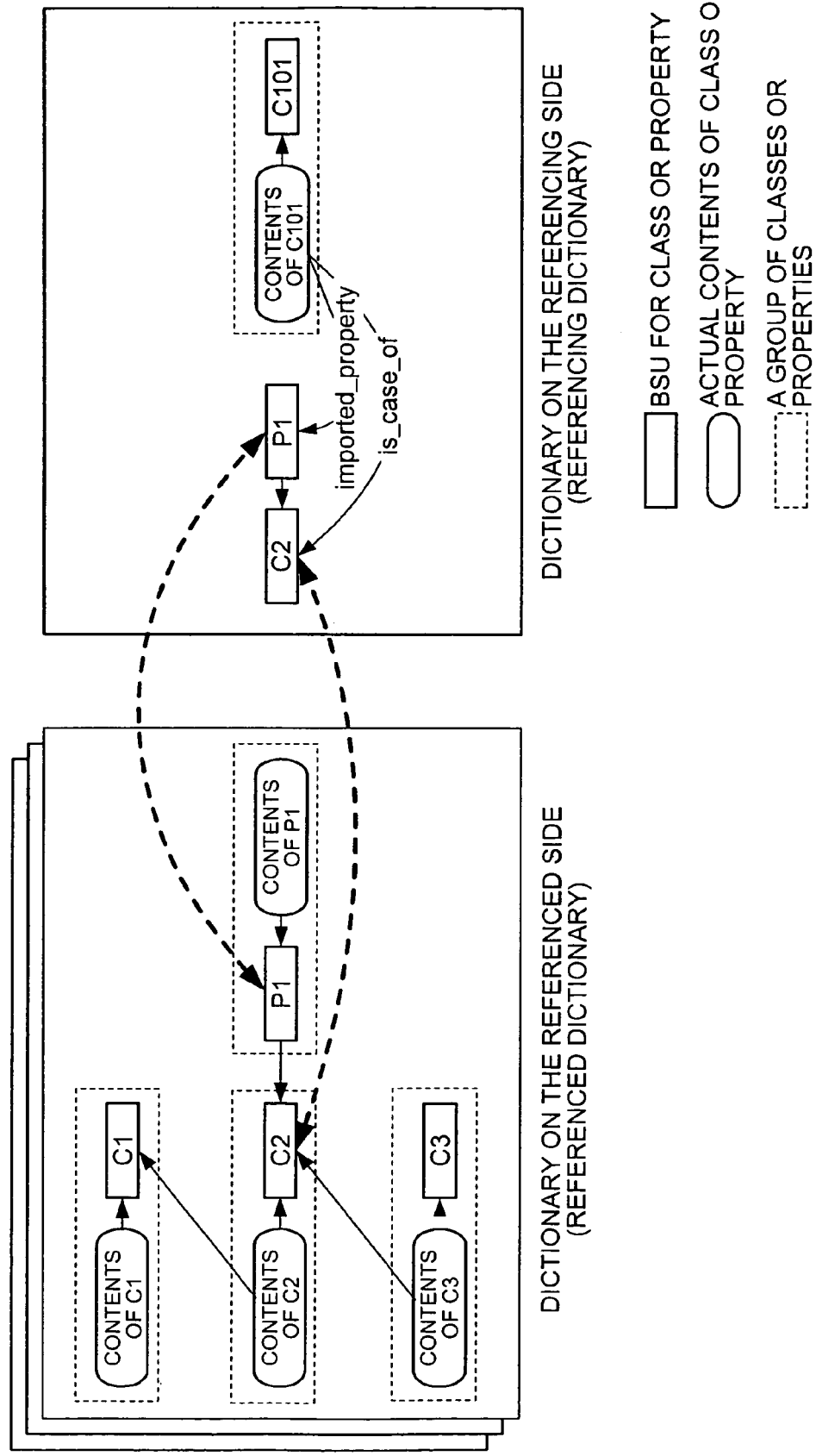
FIG. 5 is an explanatory diagram of a conventional "CaseOf" relation.

As shown in FIG. 5, generally with the conventional "CaseOf" feature, only BSU codes (pointers) for the properties defined in the referenced dictionary are described in the referencing dictionary and hence, the referenced dictionary is usually referenced for the acquisition of actual information. This means that, without referencing the referenced dictionary, the referencing dictionary side cannot acquire any detailed information including the name, definition, and data type of the imported property. To acquire the detailed information on the property imported by the referencing dictionary, the imported property needs to be found in the referenced dictionary. Usually, most of the referenced dictionaries are dictionaries complied with international standards or industry-organization dictionaries, each of which defines a huge amount of classes and properties, and among these properties, only a few are referenced and hence, efficient inter-dictionary data exchange is also desired.

In the database management system 9 of the server S, which is the database management apparatus according to the embodiment, the concept "CaseOf" is extended. More specifically, in the database management system 9 of the server S, which is the database management apparatus according to the embodiment, not only the BSU codes (pointers) of the imported properties but also a part of the information are taken into the referencing dictionary, for the effective operation of the referencing dictionary. This process will be described in detail below.

Figure 6:
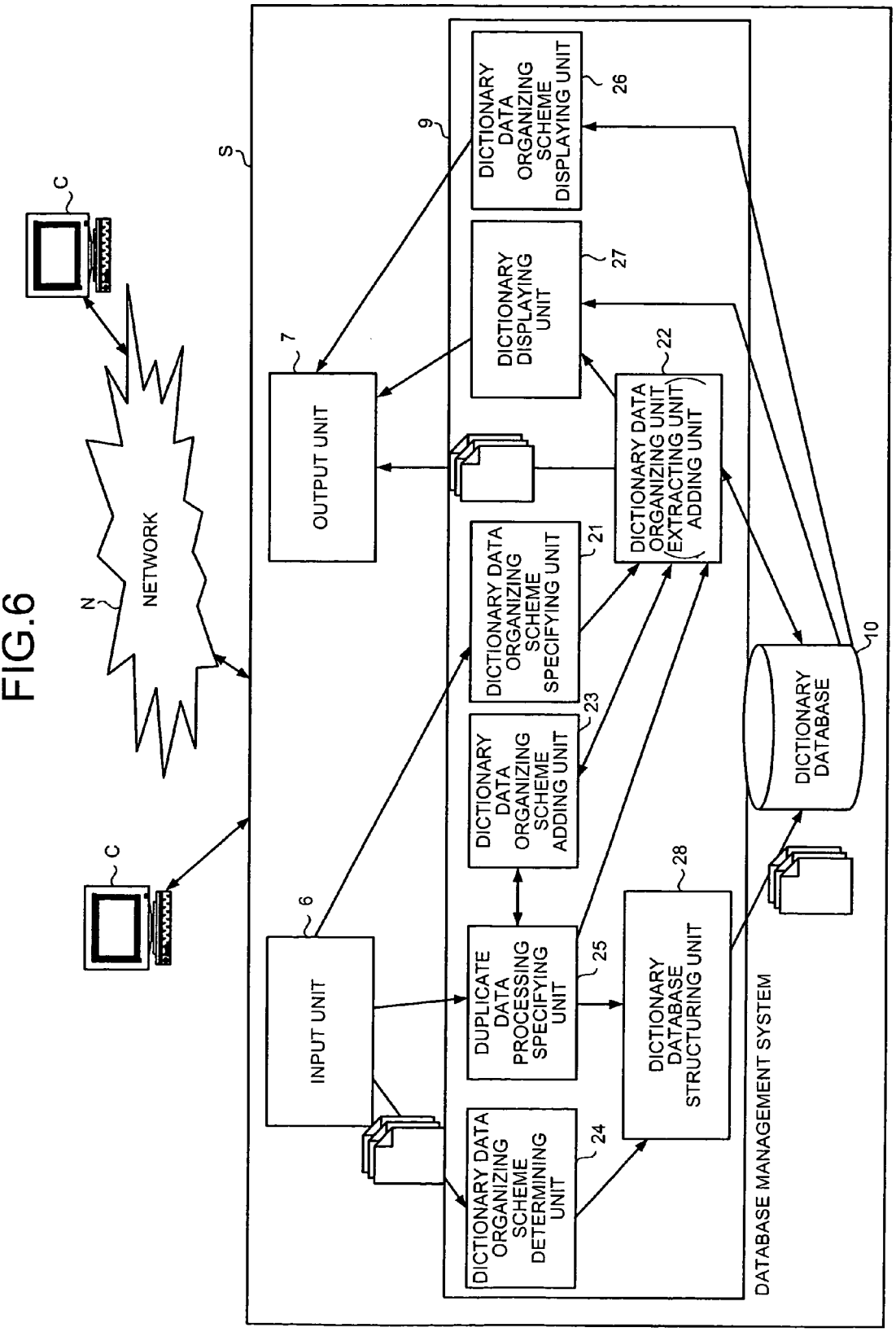
FIG. 6 is a functional block diagram of a structure of a database management system.

FIG. 6 is a functional block diagram of the structure of the database management system 9. As shown in FIG. 6, the database management system 9 has a dictionary data organizing scheme specifying unit 21, a dictionary data organizing unit 22, a dictionary data organizing scheme adding unit 23, a dictionary data organizing scheme determining unit 24, a duplicate data processing specifying unit 25, a dictionary data organizing scheme displaying unit 26, a dictionary displaying unit 27, and a dictionary database structuring unit 28.

The dictionary data organizing scheme specifying unit 21 enables the user to select the extent, to which information should be extracted from the referenced dictionary retained in the dictionary database 10 for adding in the referencing dictionary for organization. An extraction extent specifying scheme (an organizing scheme) may be specified for a plurality of referenced dictionaries referenced by the referencing dictionary all together or individually. An example of the extraction extent specifying scheme (the organizing scheme) will be described later.

The dictionary data organizing unit (a extracting unit, a adding unit) 22 is capable of following a specification at the dictionary data organizing scheme specifying unit 21 to extract information from the referenced dictionary and add the information to the referencing dictionary for organization. According to the extraction extent specifying scheme (the organizing scheme), the dictionary data is processed as shown in examples given below.

<Example 1 of Organizing Scheme Type (Also Including the Detailed Information on Property)>

Figure 7:
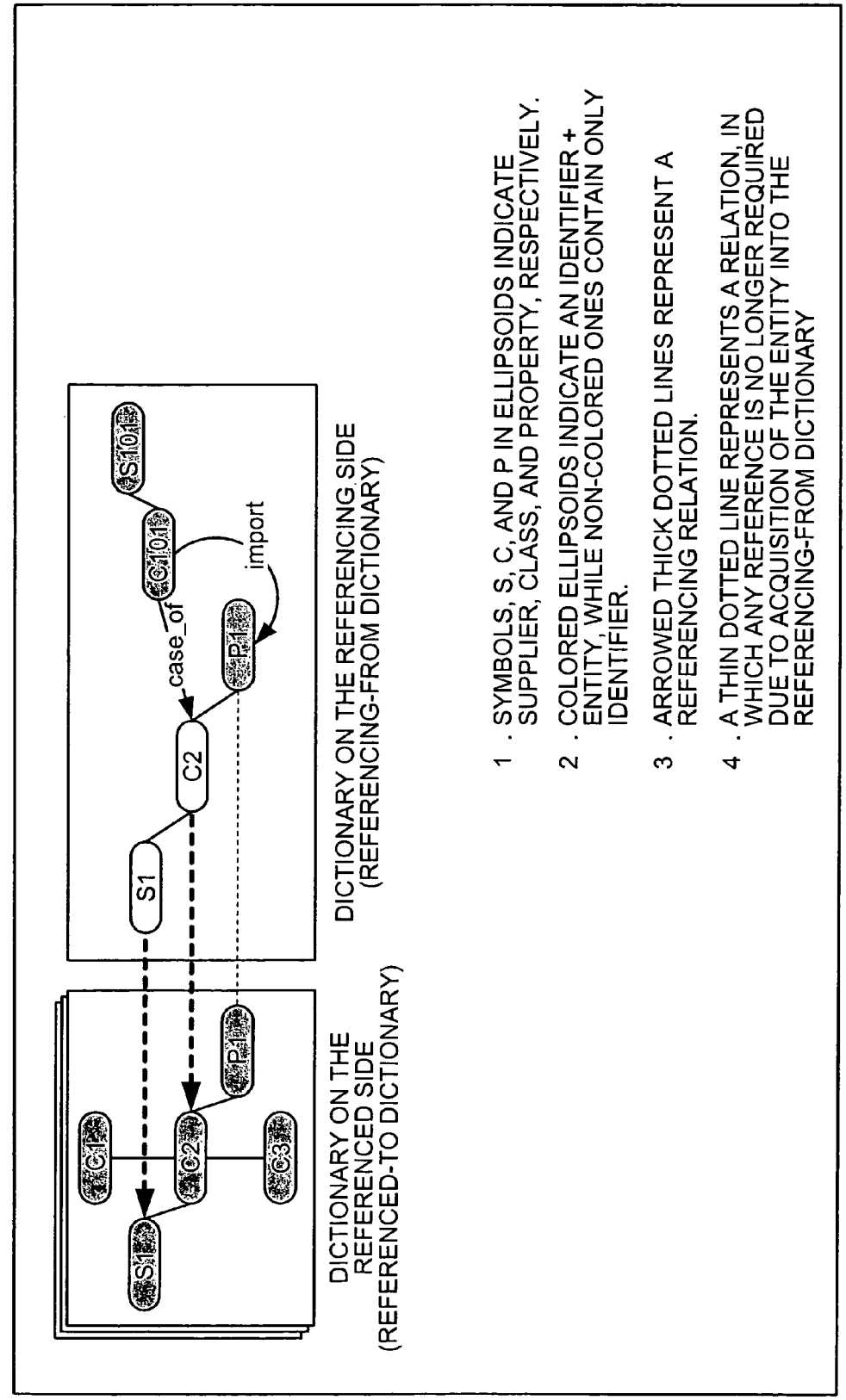
FIG. 7 is an explanatory diagram of an example of a method for structuring the database management system.

FIG. 7 is an explanatory diagram of an example of the organizing scheme. With the "CaseOf" feature provided, the imported property, the class which defines the property (name_scope), and a supplier of the defining class (defined_by) are taken into the referencing dictionary (the dictionary database 10) in the form of the BSU codes. In addition, the detailed information on the imported property is added in the referencing dictionary for organization. The organized dictionary data is stored in the dictionary database 10 and sent to the client at user's request.

<Example 2 of Organizing Scheme Type (Also Including the Detailed Information on the Properties and the Information on the Classes)>

Figure 8:
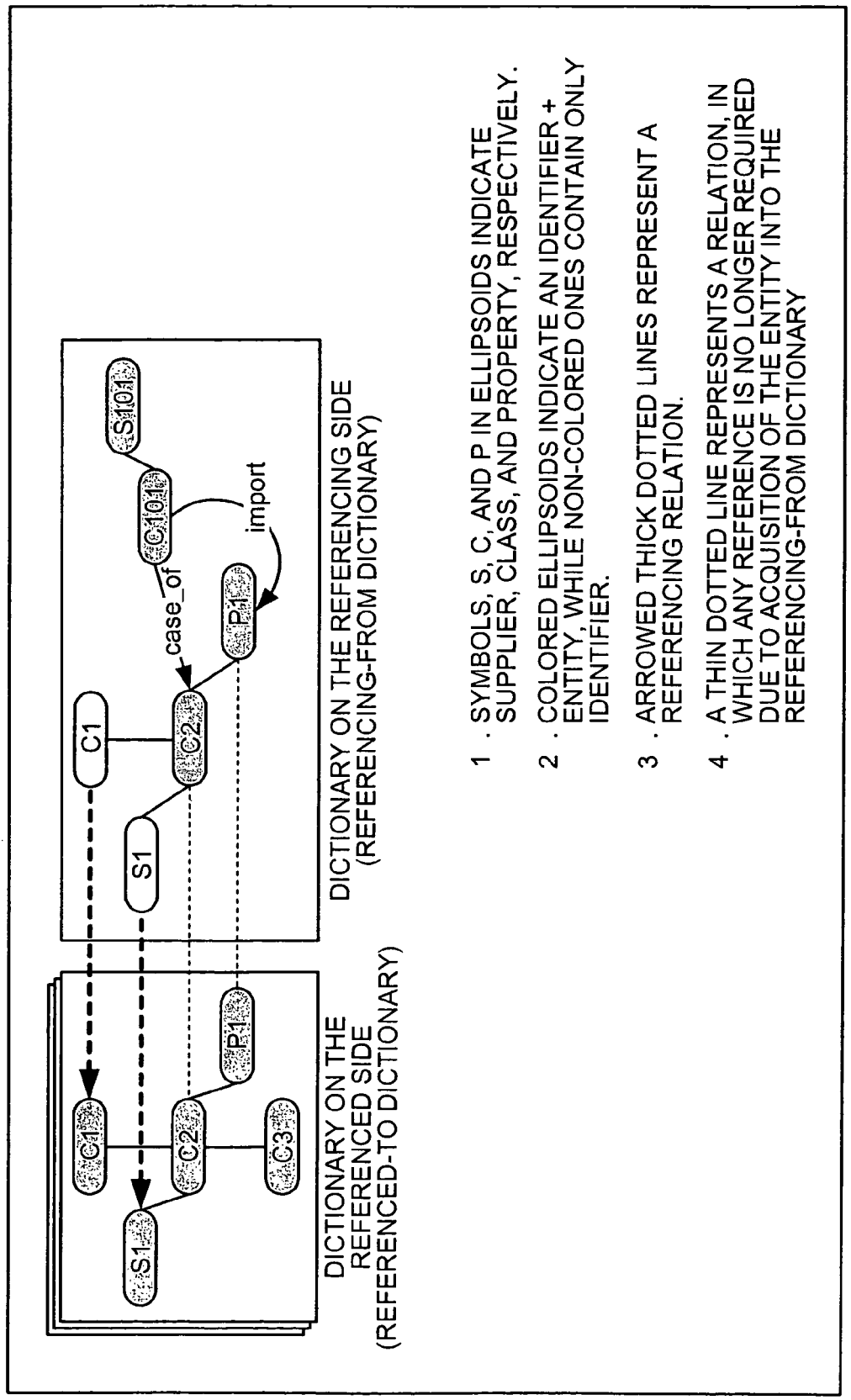
FIG. 8 is an explanatory diagram of another example of the method for structuring the database management system.

FIG. 8 is an explanatory diagram of another example of the organizing scheme. With the "CaseOf" feature provided, the imported property, the class, which defines the property (name_scope), and a supplier of the defining class (defined_by) are taken into the referencing dictionary (the dictionary database 10) in the form of the BSU codes. In addition, the detailed information on the imported property and the detailed information on the class, which defines the property, are added to the referencing dictionary (the dictionary database 10) for organization. The organized dictionary data is stored in the dictionary database 10 and sent to the client at user's request. Since the detailed information on the class includes the BSU of its upper class, the BSU of the upper class also need to be added. The detailed information on the class to be added may be extended as follows:

(1) Class information on the upper class+BSU for the further upper class;

(2) Class information on the upper class+class BSUs and class information up to a root;

(3) Class information on the upper class+class BSUs and class information up to the root+BSUs for the properties belonging to the classes and the information on the properties.

<Example 3 of Organizing Scheme Type (Also Including the Detailed Information on Properties, the Information on the Classes, and the Information on the Suppliers)>

Figure 9:
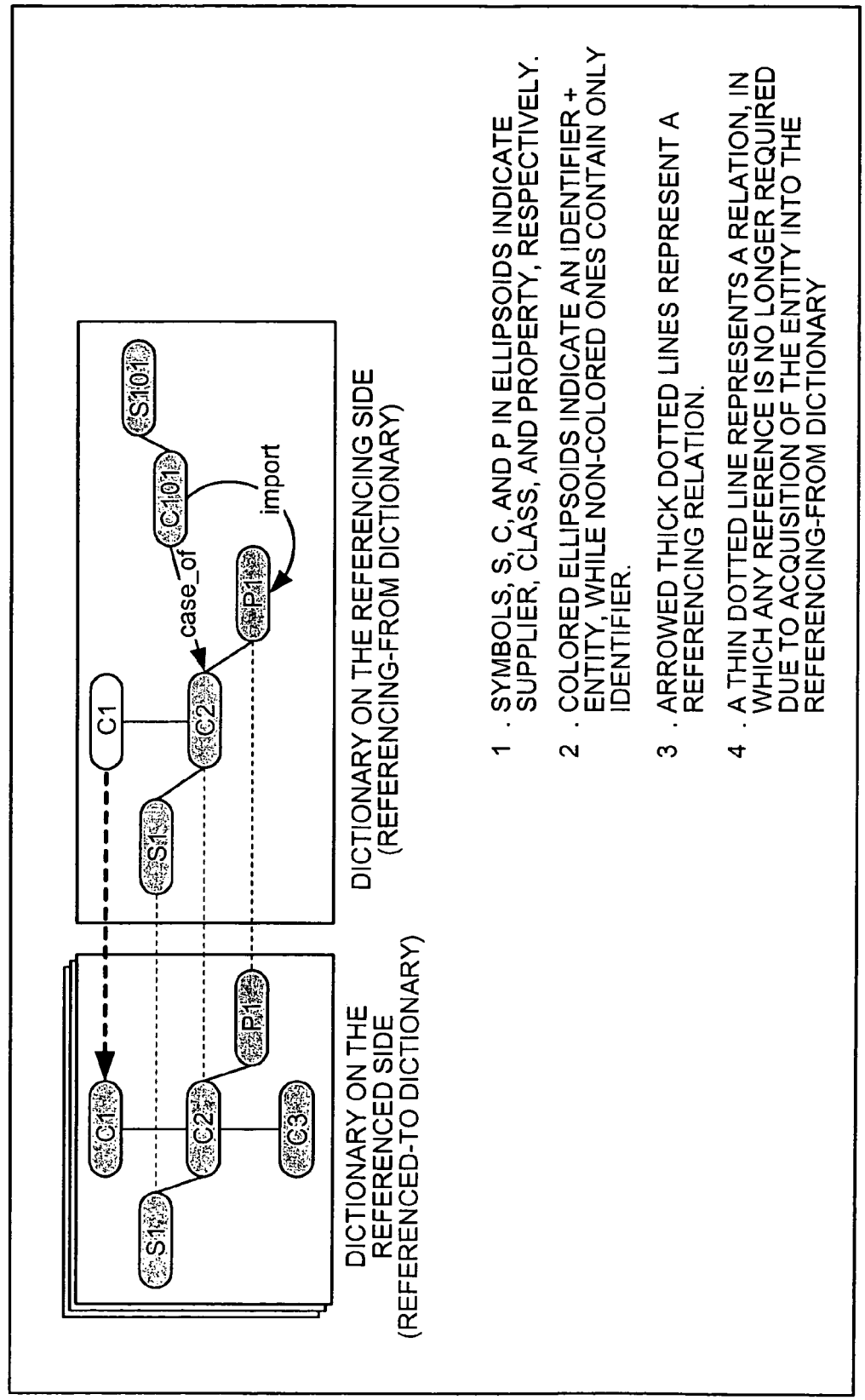
FIG. 9 is an explanatory diagram of still another example of the method for structuring the database management system.

FIG. 9 is an explanatory diagram of still another example of the organizing scheme. With the "CaseOf" feature, the imported property, the class, which defines the property (name_scope), and the supplier of the class (defined_by) are taken into the referencing dictionary (dictionary database 10) in the form of the BSU codes. In addition, the detailed information on the imported property, the detailed information on the class, which defines the property, and the detailed information on the supplier are added to the referencing dictionary (dictionary database 10) for organization. The organized dictionary data is stored in the dictionary database 10 and sent to the client at user's request.

A dictionary data organizing scheme adding unit 23 adds the organizing scheme specified in the dictionary data organizing scheme specifying unit 21 to the dictionary data in a predetermined form. An example of adding the organizing scheme is shown below.

<Example 1 of Organizing Scheme Adding Mode>

A header part of the Part21 file or an information model defined in the "PLIB" standard is wrapped, the information on the organizing scheme is added, and then the organized dictionary data is sent. FIG. 10 is an explanatory diagram of an example of adding the organizing scheme to the dictionary data. FIG. 10 shows an example of wrapping the Part21 file and adding the organizing scheme. In the example shown in FIG. 10, a Part21 file description part 202 is wrapped by enclosing between tags <Part21> and </Part21>. The information on the organizing scheme is described within a part 201 enclosed by the tags <CASEOF> and </CASEOF>. In this example, secondary information for the information in the part 202 includes a supplier "140/E-Commerce" and properties "E_P0001" and "E_P0002" defined in the class "E_C0001", which means that the detailed information on the properties are also included. In addition, the information on another supplier "140/AAA" and the property "A_P001" defined in the class "A_C001" indicates that the detailed information on the class and the detailed information on the property are included.

The header part of the Part21 file may be described using one of attributes of an entity "FILE_NAME" in the header of the Part21 file according to, for example, the aforementioned organizing scheme.

An example shown in FIG. 11 shows a description with the use of an attribute "organization", which is the attribute of the entity FILE_NAME. A receiving party may easily interpret the extent, to which the information on the referenced class and the properties thereof is included in the Part21 file, by interpreting the special tags <caseof> and </caseof>.

Note that the entity described herein is a basic unit for describing the schema for representing the data model in an EXPRESS language. The entity has the attribute. The attribute may indicate another entity.

<Example 2 of Organizing Scheme Adding Mode>

The schema is described using the entity in the data model. The dictionary data may take any of Part21, XML, and other modes.

In the referencing dictionary, the referencing class is represented by a CASE_OF class. With the entity, this class is represented as "ITEM_CLASS_CASE_OF". For example, it may be possible to extend the schema so as to create the lower entity "EXTENSION_ITEM_CLASS OF" under the entity "ITEM_CLASS_CASE_OF", to add an attribute for adding the information on the organizing scheme, and to describe the organizing scheme therein. An example of the aforementioned extended schema is shown in FIG. 12. An example of description in the Part21 file is shown in FIG. 13.

An attribute "imported_areas" may be described in various manners, for example, the aforementioned manner or such a manner that only the extent ("PROPERTY", "CLASS_PROPERTY") is listed in association with "imported_properties" in the same entity.

<Example 3 of Organizing Scheme Adding Mode>

The information is described in another file. The dictionary data may take any of Part21, XML, and other modes.

The dictionary data organizing scheme determining unit 24 receives the dictionary data (the referencing dictionary) from the input unit 6, reads out and determines the organizing scheme added at the dictionary data organizing scheme adding unit 23, and passes the organizing scheme to the dictionary database structuring unit 28. If no organizing scheme is added, the organizing scheme is read out and determined from an implication of the dictionary data (the referencing dictionary) received from the input unit 6.

The dictionary data organizing scheme displaying unit 26 displays the organizing scheme used in organizing the referencing dictionary.

Figure 14:
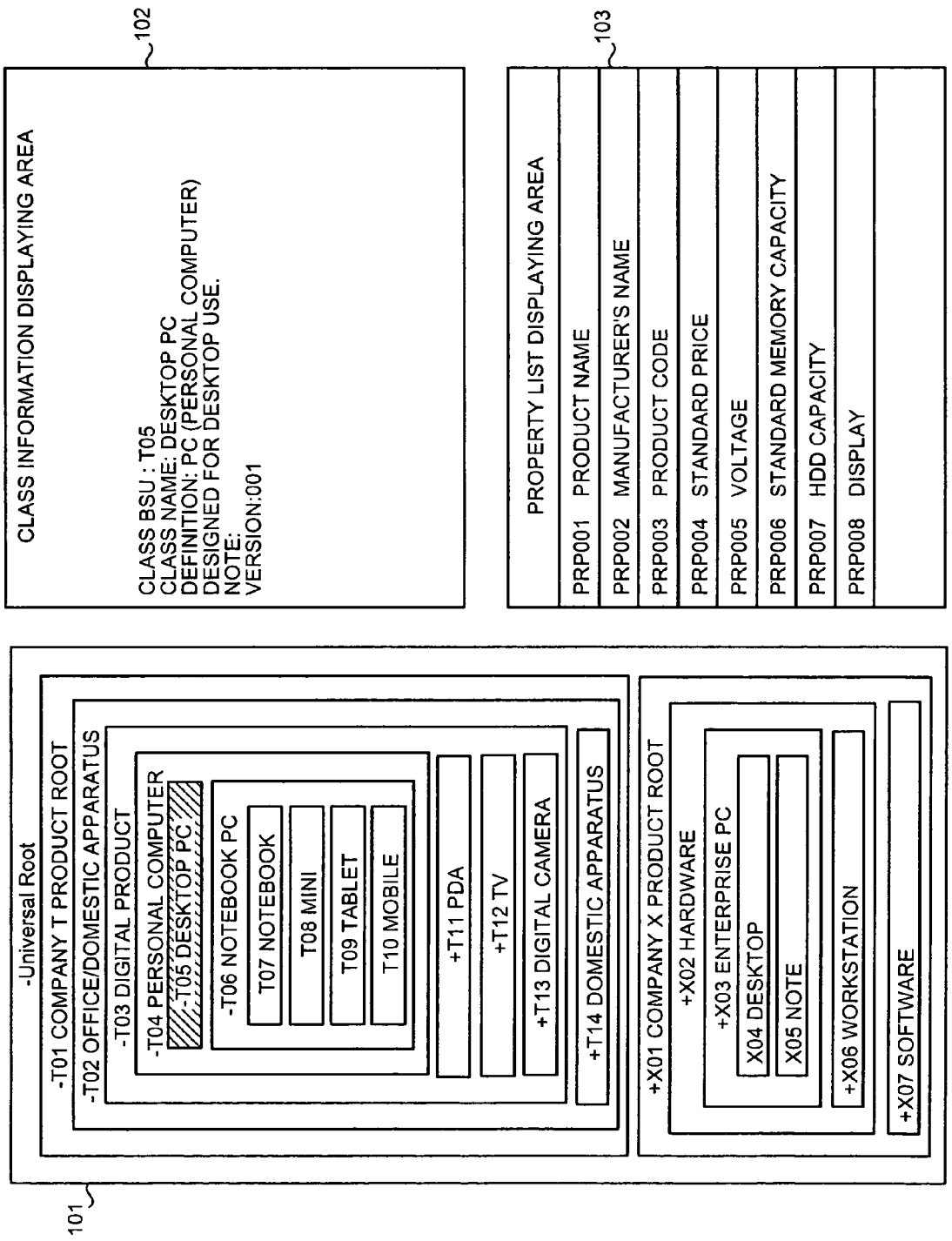
FIG. 14 is a front view of an example of a Graphic User Interface (GUI) in a hierarchical database.

The dictionary displaying unit 27 displays the dictionary data organized at the dictionary data organizing unit 22. More specifically, the dictionary displaying unit 27 reads out a plurality of dictionary data from the dictionary database 10 and displays these dictionary data in the hierarchical structure including the referencing relation. FIG. 14 is a front view of an example of the GUIs 4 and 8. FIG. 14 shows an example of the GUI for displaying the class tree, classes, and properties. When a class is selected at a class tree displaying area 101, class information such as a class code for class identification, definition, note, and version is displayed in a class information displaying area 102. At the same time, a list of properties available in the class is displayed at a property list displaying area 103. In the example shown in FIG. 14, when the class code "T05: desktop PC" is selected in the class tree displaying area 101, the class information on "T05: desktop PC" is displayed in the class information displaying area 102, and the aforementioned eight properties are listed at the property list displaying area 103.

When a class to be selected is a CaseOf class, once the class is selected in the class tree displaying area 101, an identifier of the referenced class and a jump button (a link) for moving to the referenced class are displayed in the class information displaying area 102 in addition to the class information. Further, the properties imported from the referenced class are displayed in the property list displaying area 103 together with a mark indicating that they are imported.

The dictionary database structuring unit 28 causes the user, a dictionary administrator, or others to specify an order of precedence if the information in the referenced dictionary contained in the dictionary database 10 is inconsistent with the information in the referenced dictionary sent from the input unit 6, and then organizes the specified information into the dictionary database 10 (the referencing dictionary).

Note that the order of precedence may be set previously by the system and does not need to be specified each time. Now, the duplicate data processing specifying unit 25 will be described below. It is assumed that the referenced and referencing dictionaries are structured as shown in FIG. 7. Actual data of property P1 exists both in the referenced dictionary and the referencing dictionary. If the BSU code and the version for the property P1 are identical in both dictionaries, the same information is supposed to be contained in these dictionaries. If there is a revision, however, the actual data for the property P1 may be different between these dictionaries. The duplicate data processing specifying unit 25 enables the order of precedence to be specified for organizing the dictionary data if actual data corresponding to the same property are contained in two dictionaries. Alternatively, it may be possible to retain the information in both dictionaries when the dictionary database 10 is organized, and to specify one of these dictionaries at the time of display or output.

Next, a representative flow of the processing in the database management system 9 structured as mentioned above will be described below.

First, dictionary output processing in the database management system 9 will be described. This type of dictionary output processing is executed when the referencing dictionary is mainly output from the dictionary database 10 at the user's request.

Figure 15:
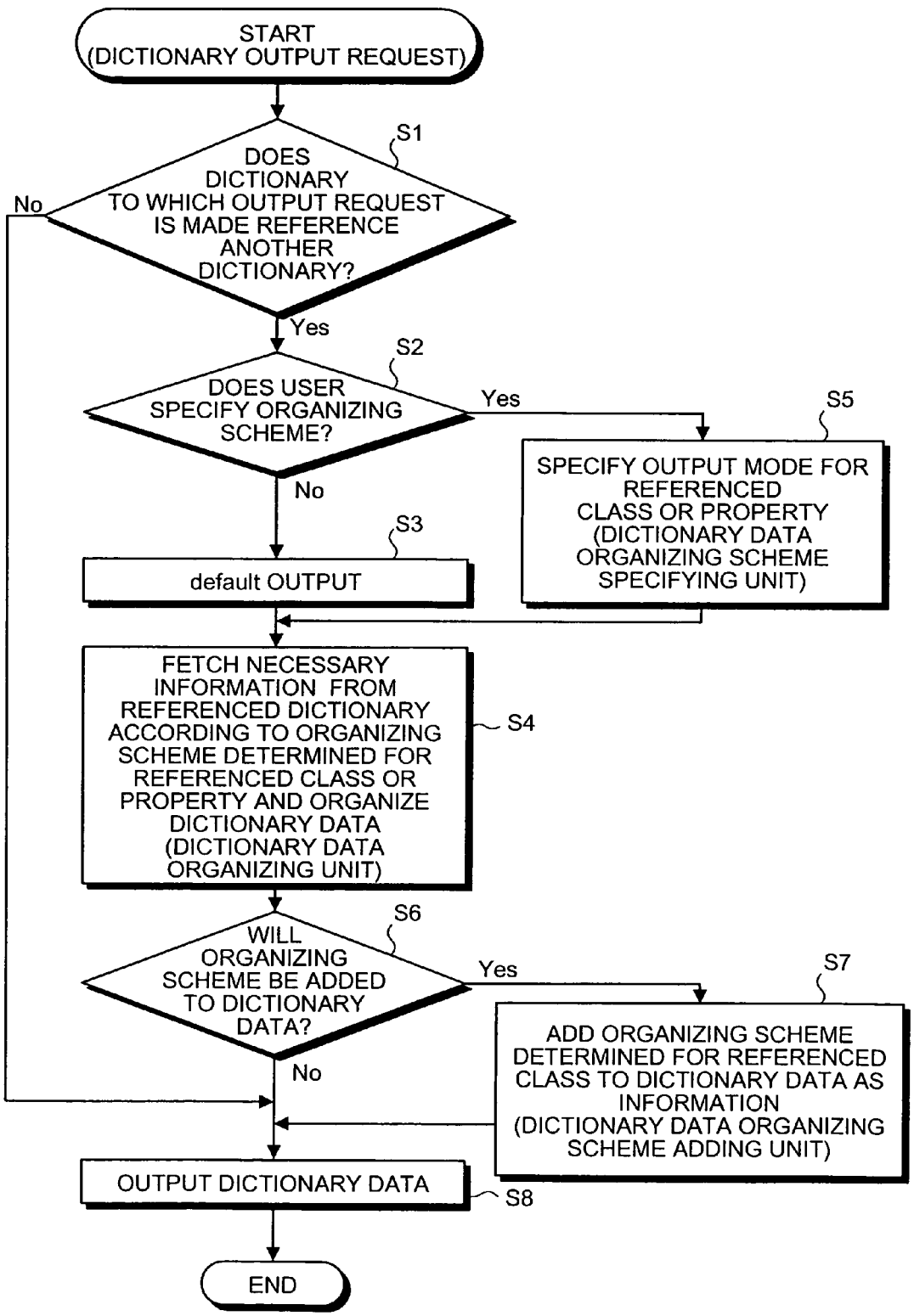
FIG. 15 is a flowchart showing a flow of an output processing of the dictionary.

FIG. 15 is a flowchart of a flow of the dictionary output processing. As shown in FIG. 15, in the dictionary output processing, it is determined whether the dictionary, for which an output processing request is issued, references another dictionary using "CaseOf" (step S1). If the dictionary, for which the output processing request is issued, is determined to reference another dictionary (Yes in step S1) and the user does not specify the organizing scheme (No in step S2), the organizing scheme previously set is determined to be adopted (step S3) and necessary information is fetched from the referenced dictionary according to the organizing scheme determined for each referenced class or property for organizing the dictionary data (the referencing dictionary) (step S4: dictionary data organizing unit 22). On the other hand, if the user specifies the organizing scheme (Yes in step S2), the output mode of each referenced class or property is specified (step S5: dictionary data organizing scheme specifying unit 21) and then the necessary information is fetched from the referenced dictionary according to the organizing scheme specified for each referenced class or property for organizing the dictionary data (the referencing dictionary) (step S4: dictionary data organizing unit 22). If the organizing scheme is to be added to the dictionary data (the referencing dictionary) (Yes in step S6), the organizing scheme specified for each referenced class is added to the dictionary data (the referencing-to dictionary) (step S7: dictionary data organizing scheme adding unit 23) and then the dictionary data (the referencing dictionary) is output (step S8). Here, the dictionary data may be output not only on the display device but also to the file. On the other hand, if no organizing scheme is added to the dictionary data (the referencing dictionary) (No in the step 6), the dictionary data (the referencing dictionary) is output as it is (step S8). In addition, when it is determined that the dictionary, for which the output processing request is issued, does not reference another dictionary (No in step S1), the dictionary data is also output as it is (step S8).

Now, an example of description of the dictionary database 10 (referencing dictionary) based on the "PLIB" standard will be shown in the Part21 file format.

FIG. 16 shows an example of the description of the referencing dictionary with the detailed information on the imported property added. A shaded portion in FIG. 16 indicates the detailed information on the added imported property. Inclusion of the detailed information in the referencing dictionary allows the name, definition, data type, and unit of the imported property to be read out independently.

FIG. 17 shows an example of the description of the referencing dictionary with the detailed information on the imported property and the detailed information on the class, which defines the property added. A shaded portion in FIG. 17 indicates an example of the description of the referencing dictionary with the class information on the referenced dictionary added in addition to the information shown in FIG. 16. In the example, in addition to information on the referenced class "E_C0001", the class BSU code "E_C0000" for the upper class of the "E_C0001" is included.

FIG. 18 shows an example of the description of the referencing dictionary with the detailed information on the imported property, the detailed information on the class, which defines the property, and the detailed information on the supplier added. A shaded portion in FIG. 18 indicates the referencing dictionary with the detailed information on the referenced supplier "140/E-Commere" added in addition to the information shown in FIG. 17.

Thus, the referencing dictionary may be efficiently operated through acquisition of not only the BSU code (pointer) for the imported property but also some detailed information into the referencing dictionary with the use of "CaseOf".

Note that in FIGS. 16 to 18, though the examples of the description in the Part21 file are given, the description may be given similarly in the XML or any other scheme.

Next, dictionary input processing in the database management system 9 is described below. This type of dictionary input processing is executed when the dictionary data (the referencing dictionary) entered by the user is organized.

Figure 19:
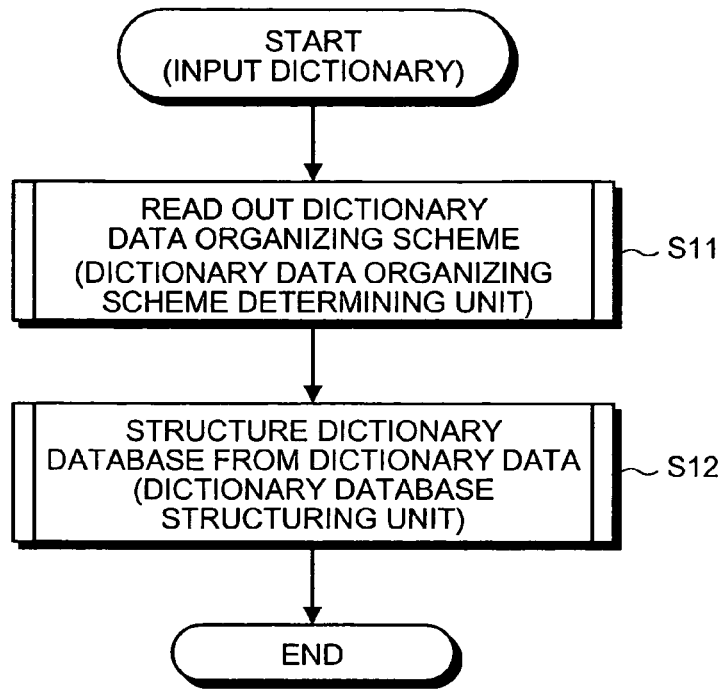
FIG. 19 is a flowchart showing a flow of an input processing into the dictionary.
Figure 20:
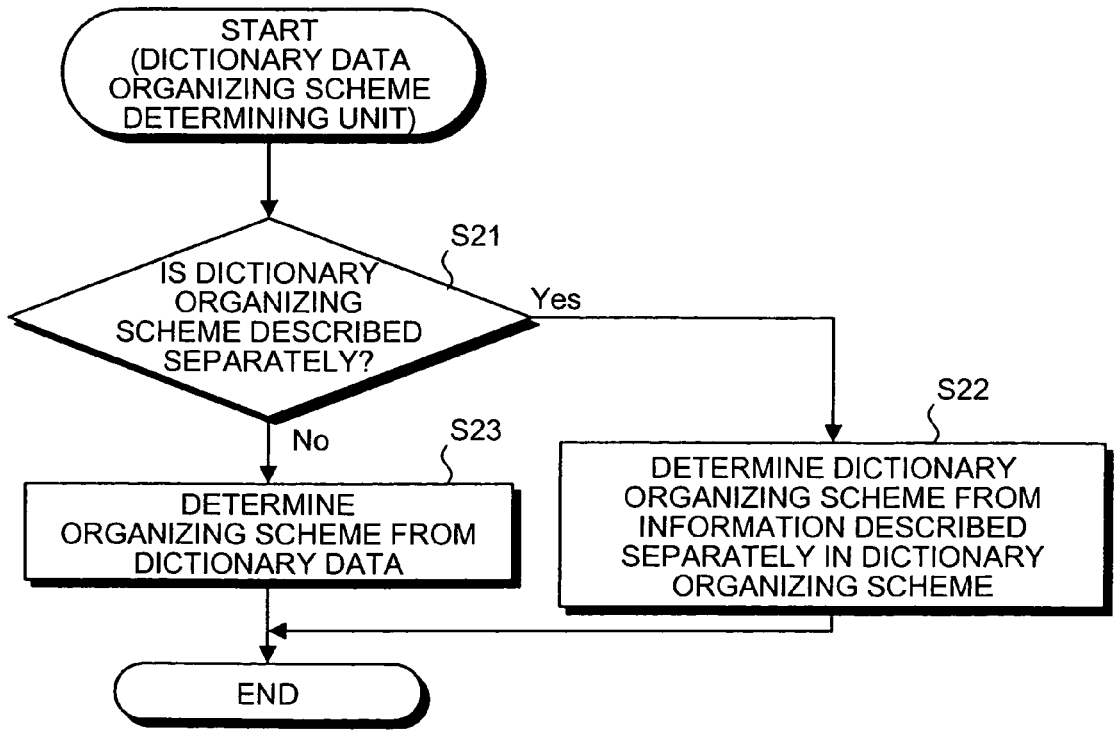
FIG. 20 is a flowchart showing a flow of a processing at a dictionary data organizing scheme determining unit.

FIG. 19 is a flowchart of the flow of the dictionary input processing. As shown in FIG. 19, in the dictionary input processing, the organizing scheme added to the dictionary data (the referencing dictionary) received from the input unit 6 is first read out (step S11: dictionary data organizing scheme determining unit 24). More specifically, as shown in FIG. 20, it is determined whether the dictionary organizing scheme is separately described in the dictionary data (the referencing dictionary) received from the input unit 6 (step S21). If the dictionary organizing scheme is determined to be separately described (Yes in step S21), the dictionary organizing scheme is determined based on the information contained in the separately described dictionary organizing scheme and passed to the dictionary database structuring unit 28 (step S22). On the other hand, if no dictionary organizing scheme is determined to be separately described (No in step S21), the dictionary organizing scheme is read out and determined based on an implication in the dictionary data (referencing dictionary) received from the input unit 6 and passed to the dictionary database structuring unit 28 (step S23).

Figure 21:
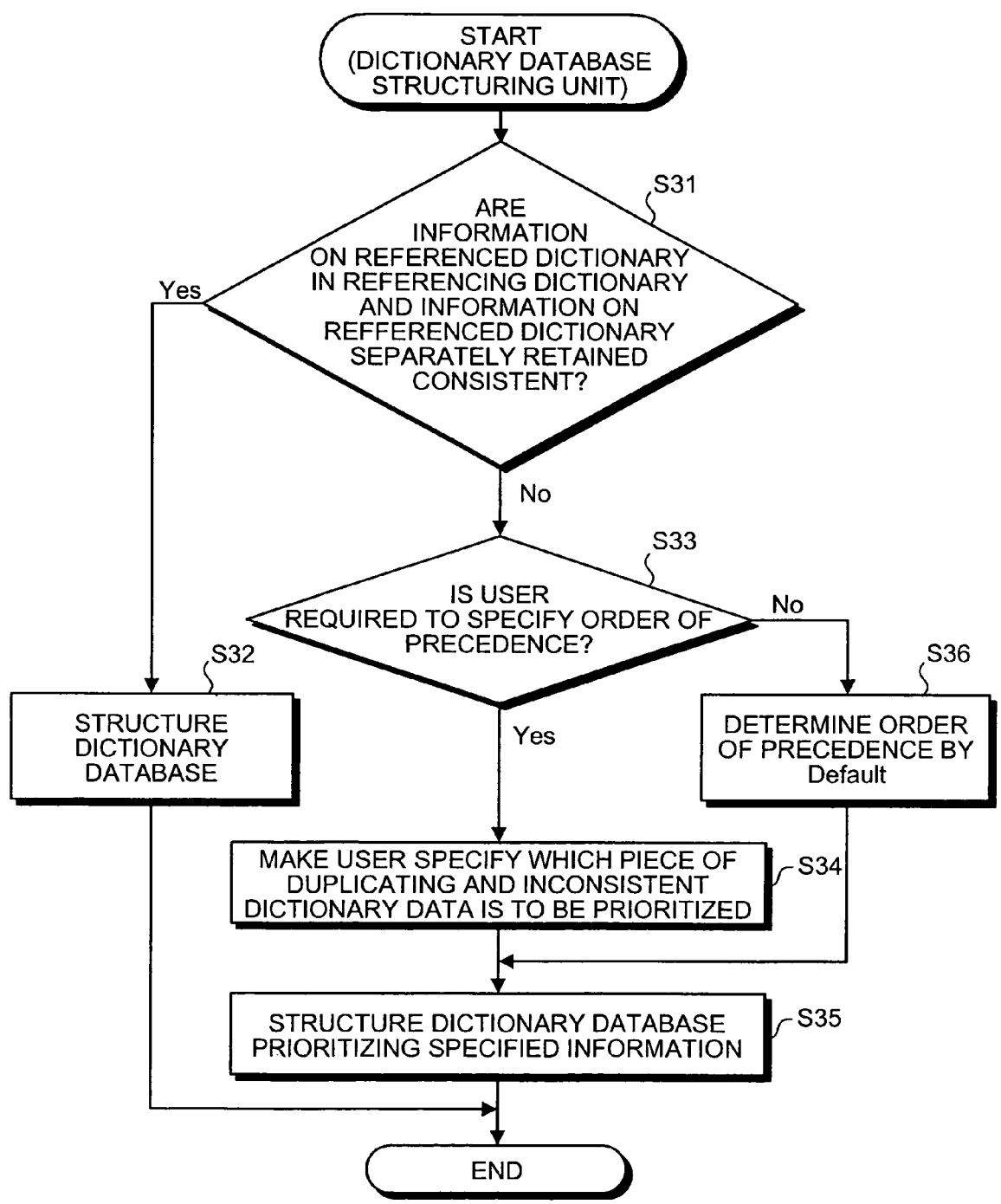
FIG. 21 is a flowchart showing a flow of a processing at a dictionary database structuring unit.

Next, as shown in FIG. 19, the dictionary database 10 (the referencing dictionary) is organized from the dictionary data (the referencing dictionary), for which the dictionary organizing scheme is determined in step S11 (step S12: dictionary database structuring unit 28). More specifically, as shown in FIG. 21, it is first determined whether the information on the referenced dictionary contained in the entered referencing dictionary is consistent with the information on the referenced dictionary retained in the dictionary database 10 (step S31). If the information on the referenced dictionary contained in the referencing dictionary is determined to be consistent with the information on the referenced dictionary retained in the dictionary database 10 (Yes in step S31), the process goes to step S32 for organizing the dictionary database 10 (the referencing dictionary). On the other hand, if the information on the referenced dictionary contained in the referencing dictionary is determined to be inconsistent with the information on the referenced dictionary retained in the dictionary database 10 (No in step S31) and the user needs to specify an order of precedence (Yes in step S33) the user is made to specify one piece of dictionary data to prioritize between two pieces of dictionary data which are duplicating and inconsistent (step S34), and the dictionary database 10 (the referencing dictionary) is organized with precedence put on the specified information (step S35). If the user needs not to specify the order of precedence (No in step S33), the information is specified according to the order of precedence previously set in the duplicate data processing specifying unit 25 (step S36), and the dictionary database 10 (the referencing dictionary) is organized with the precedence put on the specified information (step S35). Note that if the dictionary database 10 contains no referenced dictionary, based on the assumption that there is no inconsistency, the steps S31 and S32 are executed sequentially.

Next, a dictionary display processing in the database management system 9 is described below. This type of dictionary display processing is executed when the dictionary database 10 (the referencing dictionary) is displayed at user's request.

Figure 22:
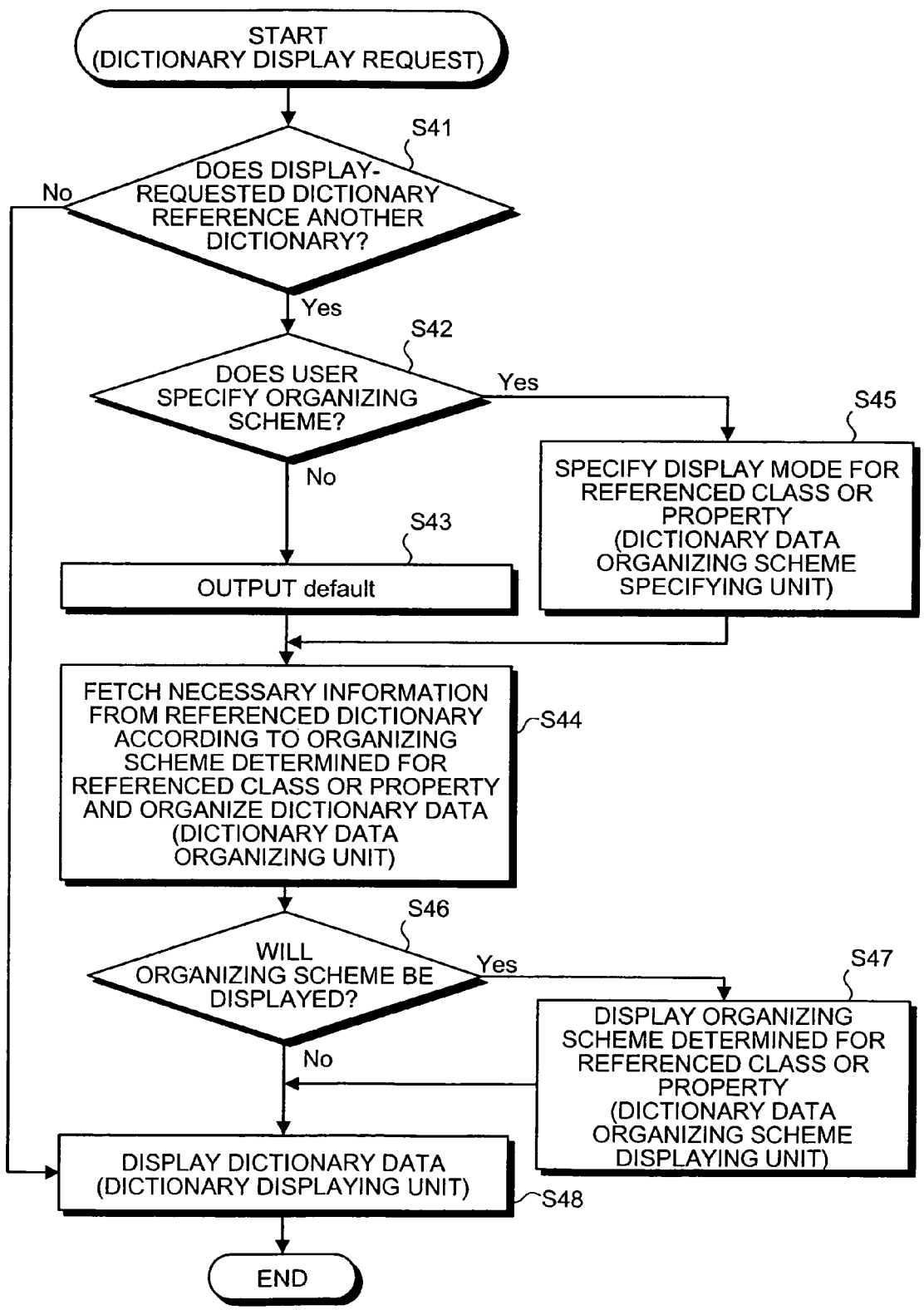
FIG. 22 is a flowchart showing a flow of a display processing of the dictionary.

FIG. 22 is a flowchart of a flow of the dictionary display processing. As shown in FIG. 22, in the dictionary display processing, it is first determined whether the dictionary, for which a display request is issued, references another dictionary using "CaseOf" (step S41). If the dictionary, for which the display request is issued, is determined to reference another dictionary (Yes in step S41) and the user does not specify the organizing scheme (No in step S42), the previously set organizing scheme is determined to be adopted (step S43) and the necessary information is fetched from the referenced dictionary for organizing the dictionary data (the referencing dictionary) (step S44: dictionary data organizing unit 22). On the other hand, if the user specifies the organizing scheme (Yes in step S42), the display mode is confirmed for each referenced class or property (step S45: dictionary data organizing scheme specifying unit 21), and the necessary information is fetched from the referenced dictionary according to the organizing scheme confirmed for each referenced class or property for organizing the dictionary data (the referencing dictionary) (step S44: dictionary data organizing unit 22). When the organizing scheme is to be displayed (Yes in step S46), the organizing scheme confirmed for each referenced class or property is displayed (step S47: dictionary data organizing scheme displaying unit 26) and the dictionary data (referencing dictionary) is displayed at the output unit 7 (step S48: dictionary displaying unit 27). Here, the dictionary displaying unit 27 displays the dictionary data as a dictionary having a hierarchical structure in a form indicating the referencing relation as well. On the other hand, when the organizing scheme is not to be displayed (No in step S46), the dictionary data (referencing dictionary) is displayed on the output unit 7 as it is (step S48: dictionary displaying unit 27). Even if it is determined that the dictionary, for which the display request is issued, does not reference another dictionary (No in step S41), the dictionary data is displayed at the output unit 7 as it is (step S48: dictionary displaying unit 27). In these cases, the dictionary displaying unit 27 displays the dictionary data (the referencing dictionary) organized at the dictionary data organizing unit 22 as a dictionary having the hierarchical structure.

Thus, according to the embodiments of the present invention, the detailed information on the imported property may be acquired at the side of the referencing dictionary by; extracting the information on the referenced class or property from at least one referenced dictionary having a referencing relation with the referencing dictionary having the hierarchical structure, in which the lower classes inherit the properties of the upper classes; adding the extracted information to the referencing dictionary; organizing the referencing dictionary; adding the extracted detailed information to the referencing dictionary; and outputting the resulting information as the dictionary data. In addition, since only the information on the referenced class or property in the referenced dictionary is separately extracted, traffic of the dictionary data may be reduced, and the efficient inter-dictionary data exchange can be realized.

Still in addition, the dictionary data describing scheme may be easily identified by both data communications parties, since the information on the specifying scheme of extraction extent applied for at least one referenced dictionary, to which the referencing dictionary references, is added to the referencing dictionary, whereby the efficiency of the handling of the dictionary data can be further improved.

INDUSTRIAL APPLICABILITY

As mentioned above, the apparatus and the method for managing the database of the present invention is useful for the systems employing the hierarchical database having the hierarchical structure, in which the lower classes inherit the properties of the upper classes, and in particular, more suitable for the systems in conformity to the ISO13584 Parts Library standard, which is an international standard for implementing the electronic catalogue system that electronically provides product information.

The invention claimed is:

1. An apparatus for managing a database, the database having a hierarchical database and including lower and upper classes, the apparatus comprising:
   a processor;
   an extracting unit that extracts detailed information characterizing a class and a property which is included in at least one referenced dictionary and which is referenced to by a referencing dictionary, the detailed information including one of a name or a definition concerning the class or the property,
   the referencing dictionary having a hierarchical structure in which the lower classes inherit properties of the upper classes,
   each of the class and the property having an identifier which uniquely identifies each of the class and the property,
   the referenced dictionary having a referencing relation described by the identifier as a pointer with the referencing dictionary;
   an adding unit that adds the extracted detailed information to the referencing dictionary;
   a dictionary data organizing scheme-determining unit that accepts an input of the referencing dictionary having added the detailed information, and makes a determination on the information of an extraction extent of the referenced dictionary included in the accepted referencing dictionary;
   a dictionary database-structuring unit that structures the referencing dictionary according to one of a result of the determination by the dictionary data organizing scheme determining unit or a previously stored version of the information on the specifying scheme of the extraction extent of the reference dictionary, and
   an output unit that outputs the structured referencing dictionary.

2. The apparatus according to claim 1, wherein the adding unit organizes the referencing dictionary by adding detailed information on the property referenced to in the referenced dictionary to the referencing dictionary.

3. The apparatus according to claim 1, wherein the adding unit organizes the referencing dictionary by adding detailed information on the property which is referenced to, and detailed information on the class which defines the property in the referenced dictionary to the referencing dictionary.

4. The apparatus according to claim 1, wherein the adding unit organizes the referencing dictionary by adding detailed information on the property which is referenced to, detailed information on the class which defines the property, and detailed information on a supplier in the referenced dictionary to the referencing dictionary.

5. The apparatus according to claim 1, further comprising:
   a dictionary-displaying unit that displays organized content of the referencing dictionary in the hierarchical structure including a referencing relation.

6. The apparatus according to claim 1, further comprising:
   a dictionary data organizing scheme-adding unit that adds information on a specifying scheme of an extraction extent of at least one of the referenced dictionary which the referencing dictionary references to, to the referencing dictionary, when a part of the referenced dictionary is extracted for an organization of the referenced dictionary.

7. The apparatus according to claim 6, further comprising:
   a dictionary data organizing scheme-specifying unit that brings about a specification of the information on the specifying scheme of the extraction extent of the referenced dictionary to be added to the referencing dictionary.

8. The apparatus according to claim 1, wherein the dictionary data organizing scheme-determining unit makes determination by reading out the information on the specifying scheme of the extraction extent of the referenced dictionary to be added to the referencing dictionary.

9. The apparatus according to claim 1, further comprising:
   a duplicate data processing-specifying unit that previously specifies which is to be put precedence between the result of determination by the dictionary data organizing scheme-determining unit and the previously stored version of the information on the specifying scheme of the extraction extent of the referenced dictionary, when data in the result of determination is not consistent with corresponding data in the information on the specifying scheme.

10. The apparatus according to claim 6, further comprising:
   a dictionary data organizing scheme-displaying unit that displays the information on the specifying scheme of the extraction extent for at least one of the referenced dictionary which is referenced to by the referencing dictionary.

11. A method for managing a database, the database having a hierarchical database and including lower and upper classes, comprising:
   extracting detailed information characterizing a class and a property which is included in at least one referenced dictionary and which is referenced to by the referencing dictionary, the detailed information including one of a name or a definition concerning the class or the property, the referencing dictionary having a hierarchical structure in which the lower classes inherit properties of the upper classes, each of the class and the property having an identifier which uniquely identifies each of the class and the property, the referenced dictionary having a referencing relation described by the identifier as a pointer with the referencing dictionary;

adding the extracted detailed information to the referencing dictionary;

accepting an input of the referencing dictionary having added the detailed information, and making a determination on the information of an extraction extent of the referenced dictionary included in the accepted referencing dictionary;

structuring the referencing dictionary according to one of a result of the determination or a previously stored version of the information on the specifying scheme of the extraction extent of the reference dictionary, and outputting the structured referencing dictionary.

* * * * *